US012151482B2

(12) United States Patent
Seki et al.

(10) Patent No.: US 12,151,482 B2
(45) Date of Patent: Nov. 26, 2024

(54) PRINTING APPARATUS AND PRINTING METHOD

(71) Applicant: MIMAKI ENGINEERING CO., LTD., Nagano (JP)

(72) Inventors: Akifumi Seki, Nagano (JP); Soichiro Takehana, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 80 days.

(21) Appl. No.: 17/881,617

(22) Filed: Aug. 5, 2022

(65) Prior Publication Data

US 2023/0057227 A1 Feb. 23, 2023

(30) Foreign Application Priority Data

Aug. 18, 2021 (JP) ................................ 2021-133419

(51) Int. Cl.
*B41J 2/175* (2006.01)
*B41J 2/14* (2006.01)

(52) U.S. Cl.
CPC ....... *B41J 2/17556* (2013.01); *B41J 2/14233* (2013.01); *B41J 2002/14459* (2013.01); *B41J 2002/14483* (2013.01)

(58) Field of Classification Search
CPC ................ B41J 2/17556; B41J 2/14233; B41J 2002/14459; B41J 2002/14483
See application file for complete search history.

(56) References Cited

U.S. PATENT DOCUMENTS

2011/0063381 A1* 3/2011 Nitta ........................ B41J 2/175 347/85
2013/0106963 A1* 5/2013 Kawase ..................... B41J 2/18 347/85

FOREIGN PATENT DOCUMENTS

| | | |
|---|---|---|
| JP | 2002144605 | 5/2002 |
| JP | 2012210824 | 11/2012 |
| JP | 2012232595 | 11/2012 |
| JP | 2021006408 | 1/2021 |

OTHER PUBLICATIONS

"Office Action of Japan Counterpart Application", issued on Aug. 6, 2024, with English translation thereof, pp. 1-11.

* cited by examiner

*Primary Examiner* — Sharon Polk
(74) *Attorney, Agent, or Firm* — JCIPRNET

(57) ABSTRACT

A printing apparatus that performs printing through an inkjet method includes an inkjet head and an ink supply system, where the ink supply system includes a pressure damper that is a pressure adjustment mechanism, a flow path that is a container-side flow path, and a connecting member in which a flow path that is a head-side flow path for flowing ink from the pressure damper to the inkjet head is formed, the pressure damper supplies ink adjusted to a pressure in a predetermined range lower than atmospheric pressure from an output port that is a pressure adjustment mechanism outlet to the flow path, and a flow path cross-sectional area of at least one part of the flow path in the connecting member is larger than a flow path cross-sectional area of the output port.

13 Claims, 11 Drawing Sheets

| Configuration | Spray | Stripe |
|---|---|---|
| Configuration of present example | OK | OK |
| Conventional configuration | NG | NG |
| Direct-coupled configuration | NG | NG |

FIG. 5C

PRINTING APPARATUS AND PRINTING METHOD

CROSS REFERENCE TO RELATED APPLICATIONS

This application claims the priority benefit of Japanese Patent Application No. 2021-133419, filed on Aug. 18, 2021. The entirety of the above-mentioned patent application is hereby incorporated by reference herein and made a part of this specification.

TECHNICAL FIELD

The present disclosure relates to a printing apparatus and a printing method.

DESCRIPTION OF THE BACKGROUND ART

In recent years, an inkjet printer, which is a printing apparatus that performs printing using an inkjet head, has been widely used. Furthermore, conventionally, a configuration for adjusting the pressure (ink supply pressure) of the ink for supplying the ink to the inkjet head, in which the supply pressure of the ink is adjusted to a negative pressure lower than the atmospheric pressure, is known (see e.g., Japanese Unexamined Patent Publication No. 2012-232595).

SUMMARY

An embodiment of the disclosure provides a printing apparatus that performs printing through an inkjet method. The printing apparatus includes: an inkjet head that ejects ink through the inkjet method; and an ink supply system that supplies ink to the inkjet head from an ink container that stores ink outside the inkjet head. The ink supply system includes: a pressure adjustment mechanism that adjusts a pressure of ink supplied to the inkjet head, a container-side flow path that is an ink flow path for flowing ink from the ink container to the pressure adjustment mechanism, and a connecting member that is a member connecting the pressure adjustment mechanism and the inkjet head, and is formed with a head-side flow path that is an ink flow path for flowing ink from the pressure adjustment mechanism to the inkjet head. The pressure adjustment mechanism supplies ink adjusted to a pressure in a predetermined range lower than an atmospheric pressure from a pressure adjustment mechanism outlet that is an outlet connected to the head-side flow path to the head-side flow path, and a flow path cross-sectional area of at least a part of the head-side flow path in the connecting member is larger than a flow path cross-sectional area of the pressure adjustment mechanism outlet.

Another embodiment of the disclosure provides a printing method that performs printing through an inkjet method. The printing method includes the steps of: with respect to an inkjet head that ejects ink through the inkjet method, supplying ink to the inkjet head from an ink container that stores ink outside the inkjet head by an ink supply system. The ink supply system includes a pressure adjustment mechanism that adjusts a pressure of ink supplied to the inkjet head; a container-side flow path that is an ink flow path for flowing ink from the ink container to the pressure adjustment mechanism; and a connecting member that is a member connecting the pressure adjustment mechanism and the inkjet head, and is formed with a head-side flow path that is an ink flow path for flowing ink from the pressure adjustment mechanism to the inkjet head. The pressure adjustment mechanism supplies ink adjusted to a pressure in a predetermined range lower than an atmospheric pressure from a pressure adjustment mechanism outlet that is an outlet connected to the head-side flow path to the head-side flow path, and a flow path cross-sectional area of at least a part of the head-side flow path in the connecting member is larger than a flow path cross-sectional area of the pressure adjustment mechanism outlet.

Another embodiment of the disclosure provides a printing apparatus that performs printing through an inkjet method. The printing apparatus includes: an inkjet head that ejects ink through the inkjet method; and an ink supply system that supplies ink to the inkjet head from an ink container that stores ink outside the inkjet head. The ink supply system includes a pressure adjustment mechanism that adjusts a pressure of ink supplied to the inkjet head, a container-side flow path that is an ink flow path for flowing ink from the ink container to the pressure adjustment mechanism, and a head-side flow path that is an ink flow path for flowing ink from the pressure adjustment mechanism to the inkjet head. The pressure adjustment mechanism supplies ink adjusted to a pressure in a predetermined range lower than an atmospheric pressure from a pressure adjustment mechanism outlet that is an outlet connected to the head-side flow path to the head-side flow path, and the head-side flow path functions as a buffer that adjusts a flow rate of ink between the pressure adjustment mechanism outlet and the inkjet head by storing ink in a previous stage of the inkjet head, and supplies ink of an amount required by the inkjet head to the inkjet head when change in an amount of ink coming out from the pressure adjustment mechanism outlet is not in time with respect to a change in an amount of ink required by the inkjet head.

BRIEF DESCRIPTION OF THE DRAWINGS

FIG. 1A shows one example of a configuration of a main part of the printing apparatus 100. FIG. 1B shows one example of a configuration of an inkjet head 102 in the printing apparatus 100.

FIG. 2A shows one example of a configuration of the ink supply system 108. FIG. 2B shows one example of a configuration of a main part of the ink supply system 108. FIG. 2C shows one example of a configuration of a flow path 302 in a connecting member 206.

FIG. 3A shows a configuration of the connecting member 206 different from that of the present example. FIG. 3B shows one example of a configuration of the connecting member 206 of the present example.

FIGS. 5A to 5C are views describing in more detail the operation and the like of carrying out solid printing. FIG. 5A shows one example of a solid print region 500. FIG. 5B shows one example of a change in the number of ejection nozzle rows accompanying the movement of the inkjet head 102 in the main scan. FIG. 5C shows some results of experiments conducted using a plurality of configurations in which the pressure damper 204 and the inkjet head 102 are connected in different manners.

FIG. 6A is a view describing a flow velocity of the ink flowing through a flow path different from the flow path 302 of the present example. FIG. 6B shows an example of the flow velocity of the ink flowing through the flow path 302 of the present example in a simplified manner.

FIGS. 7A and 7B show modified examples of the flow path 302.

DETAILED DESCRIPTION OF EMBODIMENTS

Figure 1A:
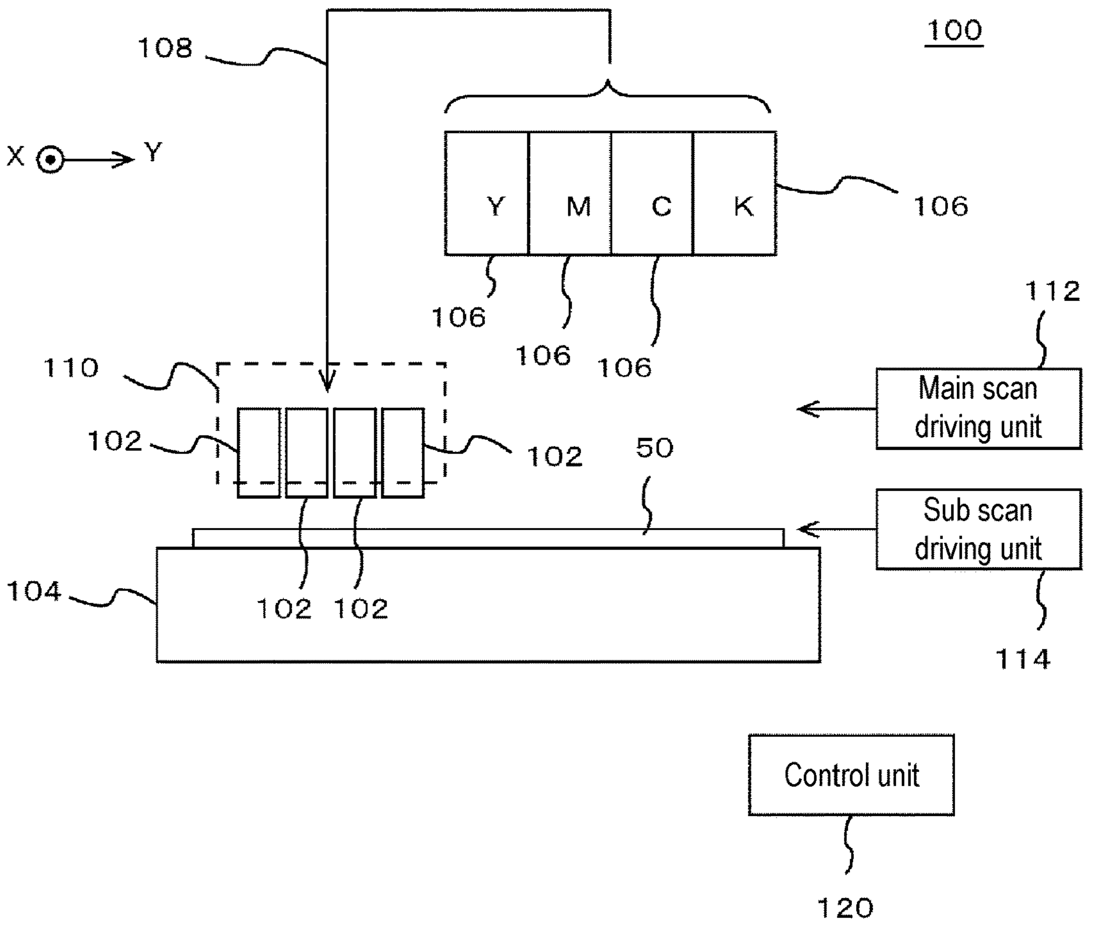
FIGS. 1A and 1B are views describing a printing apparatus 100 according to one embodiment of the present disclosure.

The inventors of the present application have found that when supplying ink to the inkjet head at the ink supply pressure adjusted to a negative pressure, a problem may arise in the quality of printing due to the influence of a pressure adjustment mechanism that adjusts the supply pressure of the ink. The present disclosure provides a printing apparatus and a printing method capable of solving the problems described above.

The inventors of the present application conducted various experiments and the like regarding a configuration of supplying ink to the inkjet head at an ink supply pressure adjusted to a negative pressure. Then, for example, when the printing speed is increased, and the like, it has been found that a problem may arise in the quality of printing due to the influence of the pressure adjustment mechanism that adjusts the supply pressure of the ink. More specifically, when carrying out printing using the inkjet head, the amount of ink required in the inkjet head usually changes during the printing operation. Therefore, for example, when carrying out printing at high speed, the change in the amount of ink coming out from the outlet of the pressure adjustment mechanism may not be in time with the change in the amount of ink required in the inkjet head. Furthermore, as a result, it is conceivable that a problem arises in the quality of printing. More specifically, in this case, for example, it is conceivable that the ink stored in the ink chamber or the like in the inkjet head becomes empty and a problem arises in the quality of printing as the supply speed of the ink from the ink supply system to the inkjet head becomes unable to catch up with the consumption speed of the ink.

In this regard, it has not been conventionally recognized that a problem occurs in the quality of printing due to such a cause. On the other hand, the inventor of the present application has found that such a problem may occur due to the influence of the pressure adjustment mechanism by conducting various experiments and the like. The inventor of the present application has found, through intensive research, that such a problem can be appropriately prevented by storing a certain amount of ink in the flow path through which the ink flows from the pressure adjustment mechanism to the inkjet head.

Furthermore, as a configuration therefor, for example, consideration is made to forming a flow path of ink in a connecting member that is a member connecting the pressure adjustment mechanism and the inkjet head, and making at least a part of the flow path thicker than the outlet of the pressure adjustment mechanism. Then, it was confirmed that the above problem can be appropriately prevented by such a configuration by further performing various experiments and the like.

Through further thorough research, the inventor of the present application found features necessary for obtaining such effects and contrived the present disclosure. In order to solve the problems described above, the present disclosure provides a printing apparatus that performs printing through an inkjet method, the printing apparatus including: an inkjet head that ejects ink through the inkjet method; and an ink supply system that supplies ink to the inkjet head from an ink container that stores ink outside the inkjet head, where the ink supply system includes a pressure adjustment mechanism that adjusts a pressure of ink supplied to the inkjet head, a container-side flow path that is an ink flow path for flowing ink from the ink container to the pressure adjustment mechanism, and a connecting member that is a member connecting the pressure adjustment mechanism and the inkjet head, and is formed with a head-side flow path that is an ink flow path for flowing ink from the pressure adjustment mechanism to the inkjet head, the pressure adjustment mechanism supplies ink adjusted to a pressure in a predetermined range lower than an atmospheric pressure from a pressure adjustment mechanism outlet that is an outlet connected to the head-side flow path to the head-side flow path, and a flow path cross-sectional area of at least a part of the head-side flow path in the connecting member is larger than a flow path cross-sectional area of the pressure adjustment mechanism outlet.

When configured in such a way, for example, the ink can be stored at a position closer to the inkjet head than the pressure adjustment mechanism with a margin with respect to the flow rate of the ink coming out from the pressure adjustment mechanism outlet by using the head-side flow path in which the flow path area of at least one part is larger than the flow path cross-sectional area of the pressure adjustment mechanism outlet. Thus, for example, when the amount of ink required in the inkjet head is changed, the ink can be more appropriately supplied to the inkjet head. Therefore, according to such a configuration, for example, a problem can be appropriately prevented from occurring in the quality of printing due to the influence of the pressure adjustment mechanism. Thus, for example, printing with higher quality can be more appropriately carried out.

In this configuration, for example, it is conceivable to use a flow path having at least one bent portion where the direction in which the ink flows changes as the head-side flow path. In this case, the head-side flow path includes, for example, a first flow path portion which is a flow path through which the ink flows on the upstream side of the bent portion at the position closest to the outlet on the inkjet head side in the head-side flow path, and a second flow path portion through which the ink flows at the position closer to the inkjet head than the first flow path portion. Furthermore, the second flow path portion is, for example, a linear flow path connected to the inlet of the ink in the inkjet, and causes the ink to flow linearly in a certain direction to the outlet on the inkjet head side in the head-side flow path. In this case, it is conceivable that the flow path cross-sectional area of at least a part of the second flow path portion is larger than the flow path cross-sectional area of the pressure adjustment mechanism outlet and larger than the flow path cross-sectional area of the first flow path portion. With this configuration, for example, the ink can be appropriately stored in the head-side flow path. Thus, for example, in a case where the amount of ink required in the inkjet head is changed, for example, by increasing the flow path area of a portion where ink is linearly flowed to the inkjet head, a required amount of ink can be quickly and appropriately supplied to the inkjet head.

Furthermore, in this configuration, the printing apparatus further includes, for example, a main scan driving unit. The main scan driving unit can be considered as, for example, a driving unit that causes the inkjet head to carry out a main scan of ejecting ink while relatively moving with respect to the ink ejecting target in a main scanning direction set in advance. Furthermore, in this configuration, the inkjet head includes, for example, four or more nozzle rows in which a plurality of nozzles are arranged with positions in the nozzle row direction orthogonal to the main scanning direction being different from each other. In this case, each nozzle row in the inkjet head is a nozzle row that ejects ink of the same color supplied from the pressure adjustment mechanism through the head-side flow path, and is aligned in the main scanning direction with positions in the main scanning direction being different from each other.

In the case of such a configuration, for example, the number of nozzle rows that simultaneously eject ink among the plurality of nozzle rows that receive the supply of ink from the common pressure adjustment mechanism in one inkjet head may change depending on the timing at the time of the main scan. In this case, the amount of ink required in the inkjet head also changes with the change in the number of nozzle rows that simultaneously eject ink. Furthermore, in this case, the number of nozzle rows that simultaneously eject ink variously changes as the number of nozzle rows is increased to four rows or more. In addition, it is also conceivable that the amount of change in the required amount of ink caused by the change of one row in the number of ejection nozzle rows that simultaneously eject ink becomes small, and the like. In this case, in the pressure adjustment mechanism, the amount of ink coming out from the pressure adjustment mechanism outlet needs to be changed every time the number of nozzle rows that simultaneously eject ink in the inkjet head changes so that the difference in the amount of ink for every stage is small and the amount of ink changes in a plurality of stages corresponding to the number of nozzle rows.

However, in this case, for example, if the speed of the relative movement of the inkjet head is increased at the time of the main scan, for example, the change in the amount of ink coming out from the outlet of the pressure adjustment mechanism is likely to fail to be in time with respect to the change in the number of nozzle rows that simultaneously eject ink. Furthermore, as a result, it is conceivable that a problem arises in the quality of printing. Furthermore, in this case, for example, if the main scan is performed so that the change in the amount of ink coming out from the outlet of the pressure adjustment mechanism is in time, the speed of the relative movement of the inkjet head becomes slow, and the speed of printing decreases. On the other hand, when configured as above, for example, the ink can be appropriately supplied to each nozzle row of the inkjet head even when the change in the amount of ink coming out from the outlet of the pressure adjustment mechanism is not in time with respect to the change in the number of nozzle rows that simultaneously eject ink. This allows, for example, high quality printing to be carried out at higher speed.

Furthermore, a state in which the change in the amount of ink coming out from the outlet of the pressure adjustment mechanism is not in time with respect to the change in the number of nozzle rows that simultaneously eject ink tends to occur in the vicinity of the end in the main scanning direction of the region where solid printing is performed, for example, in the case of performing solid printing. On the other hand, when configured as described above, for example, the printing can be appropriately performed with high quality even with respect to the vicinity of the end in the main scanning direction of the region where the solid printing is performed. In this case, the solid printing can be considered as, for example, an operation of ejecting ink from any nozzle in the inkjet head with respect to all ejection positions set according to the resolution of printing. Furthermore, in this case, the number of nozzle rows that simultaneously eject the ink changes with the relative movement of the inkjet head in the main scanning direction in the main scan in the vicinity of the end in the main scanning direction of the region where solid printing is performed. In this case, the region where the number of nozzle rows that simultaneously eject ink changes can be considered as, for example, a nozzle row number changing region. Furthermore, a portion other than the nozzle row number changing region in the region where solid printing is performed can be considered as, for example, a nozzle row number constant region. In this case, in the main scan, for example, the main scan driving unit relatively moves the inkjet head in the main scanning direction at a speed at which the ink can be supplied from the pressure adjustment mechanism to all the nozzle rows in the inkjet head in the nozzle row number constant region, and the change in the amount of ink coming out from the pressure adjustment mechanism outlet may not be in time with respect to the change in the number of nozzle rows that eject ink in the nozzle row number changing region on at least one side in the main scanning direction.

When configured in such a manner, for example, high speed printing can be carried out by appropriately increasing the relative speed of the inkjet head at the time of the main scan. Furthermore, in this case, for example, the ink can be appropriately supplied to each nozzle of the inkjet head even at the timing when the change in the amount of ink coming out from the pressure adjustment mechanism outlet is not in time with respect the change in the number of nozzle rows that eject ink by using the head-side flow path in which the flow path area of at least one part is larger than the flow path cross-sectional area of the pressure adjustment mechanism outlet. Therefore, with this configuration, for example, a high speed and high quality printing can be appropriately carried out.

Furthermore, in this configuration, the head-side flow path of the connecting member can be considered to function as, for example, a buffer with respect to the flow rate of the ink. More specifically, in this case, since the flow path cross-sectional area of at least one part of the head-side flow path in the connecting member is larger than the flow path cross-sectional area of the pressure adjustment mechanism outlet, the head-side flow path of the connecting member can be considered to function as, for example, a buffer that adjusts the flow rate of the ink between the pressure adjustment mechanism outlet and the inkjet head. Furthermore, in this case, the head-side flow path supplies the ink of the amount required by the nozzle row that eject ink to the nozzle row, for example, when the change in the amount of ink coming out from the pressure adjustment mechanism outlet is not in time with respect to the change in the number of nozzle rows that ejects ink. According to such configuration, for example, the ink can be appropriately supplied to each nozzle of the inkjet head.

Furthermore, in this configuration, the pressure adjustment mechanism includes, for example, an ink storage unit, a pressure adjusting unit, and a valve. The ink storage unit stores ink, for example, in the middle of the in-adjustment mechanism flow path. In this case, the in-adjustment mechanism flow path can be considered as, for example, a flow path of ink that causes the ink supplied from the ink container to flow toward the inkjet head in the pressure adjustment mechanism.

Furthermore, the ink storage unit is, for example, a storage unit having an opening. The pressure adjusting unit adjusts, for example, the pressure of the ink stored in the ink storage unit to a pressure lower than the atmospheric pressure. More specifically, the pressure adjusting unit includes, for example, a flexible film and biasing unit. In this case, the flexible film covers the opening of the ink storage unit, for example, in a state where the side opposite to the ink storage unit is in contact with the atmosphere. The biasing unit biases, for example, the flexible film in a direction away from the ink storage unit. Then, the pressure adjusting unit, for example, adjusts the pressure of the ink stored in the ink storage unit to a pressure lower than the atmospheric pressure by biasing the flexible film by the biasing unit. Furthermore, the valve is disposed, for example, between the ink storage unit and the inkjet head in the in-adjustment mechanism flow path. In this case, for example, the valve is opened and closed according to the difference between the pressure of the ink on the inkjet head side in the in-adjustment mechanism flow path and the pressure of the ink in the ink storage unit, so that the ink adjusted to the pressure in the predetermined range flows toward the inkjet head. According to such configuration, for example, the pressure of the ink supplied to the inkjet head can be appropriately adjusted by the pressure adjustment mechanism. For example, a known mechanical pressure damper or the like can be suitably used as the pressure adjustment mechanism.

Furthermore, the features of the speed of the relative movement of the inkjet head at the time of the main scan and the operation of supplying the ink to the inkjet head through the connecting member can also be considered, for example, by comparison with a case where the ink is supplied from the pressure adjustment mechanism to the inkjet head in the flow path in which the flow path cross-sectional area is less than or equal to the flow path cross-sectional area of the pressure adjustment mechanism outlet at all positions. More specifically, in this case, for example, while defining a configuration of supplying the ink from the pressure adjustment mechanism to the inkjet head using a connecting member having a head-side flow path in which the flow path cross-sectional area of at least one part is larger than the flow path cross-sectional area of the pressure adjustment mechanism outlet as a first ink supply configuration, and defining a configuration of using a flow path in which the flow path cross-sectional area is less than or equal to the flow path cross-sectional area of the pressure adjustment mechanism outlet at all positions as the flow path for supplying the ink from the pressure adjustment mechanism to the inkjet head as a second ink supply configuration, the features of the speed of the relative movement of the inkjet head at the time of the main scan and the operation of supplying the ink to the inkjet head through the connecting member can be considered. Furthermore, in this case, for example, in the nozzle row number changing region on the side where the number of nozzle rows that simultaneously eject ink gradually increases, for example, the main scan driving unit relatively moves the inkjet head in the main scanning direction at a speed at which the ink supplied to the nozzle row that is to eject the ink becomes short at least at some timings when the ink is supplied to the inkjet head in the second ink supply configuration. Further, for example, by supplying the ink to the inkjet head in the first ink supply configuration, the connecting member supplies the ink to the inkjet head so that the shortage of the ink to be supplied to the nozzle row that is to eject ink does not occur, for example, in the nozzle row number changing region on the side where the number of nozzle rows that simultaneously eject ink gradually increases. According to such configuration, for example, the ink can be appropriately supplied to the inkjet head while appropriately increasing the speed of the relative movement of the inkjet head at the time of the main scan. This allows, for example, high speed and high quality printing to be appropriately carried out.

The features of the present disclosure can also be considered, for example, from a viewpoint different from the above. In this case, for example, the features of the present disclosure can also be considered focusing on the fact that the head-side flow path of the connecting member functions as a buffer with respect to the flow rate of the ink. In addition, in this case, the present disclosure relates to, for example, a printing apparatus that performs printing through an inkjet method, the printing apparatus including: an inkjet head that ejects ink through the inkjet method; and an ink supply system that supplies ink to the inkjet head from an ink container that stores ink outside the inkjet head, where the ink supply system includes a pressure adjustment mechanism that adjusts a pressure of ink supplied to the inkjet head, a container-side flow path that is an ink flow path for flowing ink from the ink container to the pressure adjustment mechanism, and a head-side flow path that is an ink flow path for flowing ink from the pressure adjustment mechanism to the inkjet head, the pressure adjustment mechanism supplies ink adjusted to a pressure in a predetermined range lower than an atmospheric pressure from a pressure adjustment mechanism outlet that is an outlet connected to the head-side flow path to the head-side flow path, and the head-side flow path functions as a buffer that adjusts a flow rate of ink between the pressure adjustment mechanism outlet and the inkjet head by storing ink in a previous stage of the inkjet head, and supplies ink of an amount required by the inkjet head to the inkjet head when change in an amount of ink coming out from the pressure adjustment mechanism outlet is not in time with respect to a change in an amount of ink required by the inkjet head. It is conceivable to use a printing method having features similar to the above, and the like for the configuration of the present disclosure.

According to the present disclosure, for example, a problem can be appropriately prevented from occurring in the quality of printing due to the influence of the pressure adjustment mechanism.

Figure 1B:
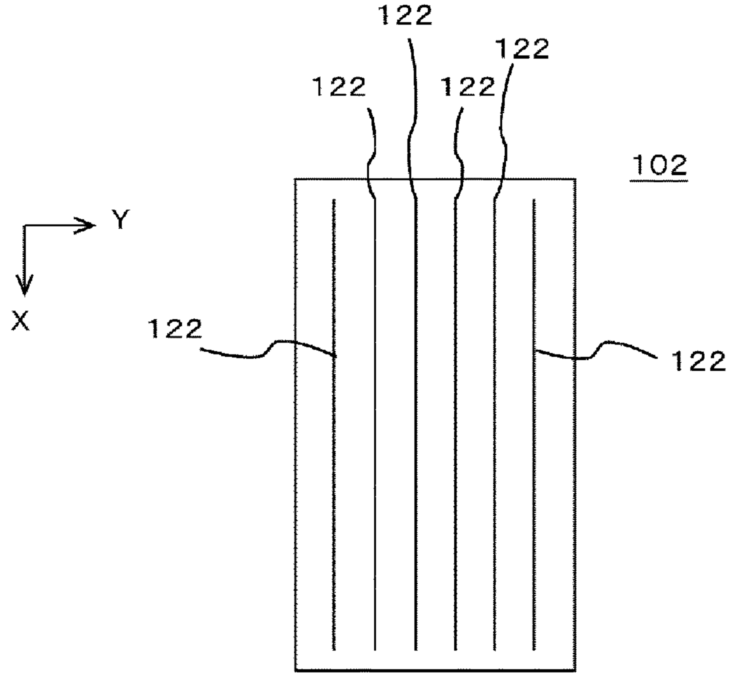

Hereinafter, an embodiment according to the present disclosure will be described with reference to the drawings. FIGS. 1A and 1B are views describing a printing apparatus 100 according to one embodiment of the present disclosure. FIG. 1A shows one example of a configuration of a main part of the printing apparatus 100. FIG. 1B shows one example of a configuration of an inkjet head 102 in the printing apparatus 100. In the present example, the printing apparatus 100 is an inkjet printer that carries out printing through an inkjet method with respect to a medium (media) 50 to be printed, and includes a plurality of inkjet heads 102, a platen 104, a plurality of ink containers 106, an ink supply system 108, a carriage 110, a main scan driving unit 112, a sub scan driving unit 114, and a control unit 120. Other than the points described below, the printing apparatus 100 may have features same as or similar to the known inkjet printers. For example, other than the configuration illustrated in FIGS. 1A and 1B, the printing apparatus 100 may further include configurations same as or similar to the known inkjet printers.

The plurality of inkjet heads 102 are ejection heads that eject ink through an inkjet method, and eject ink supplied from the plurality of ink containers 106 through the ink supply system 108 to the medium 50 to be ejected with ink or ink ejecting target. Furthermore, in the present example, each of the plurality of inkjet heads 102 ejects inks of different colors. More specifically, in the present example, each of the plurality of inkjet heads 102 ejects ink of each color of yellow (Y), magenta (M), cyan (C), and black (K), which are the ink of each color of the process color through the subtractive color mixing method. Furthermore, each of the inkjet heads 102 includes a plurality of nozzles, and ejects ink from each of the nozzles according to an image to be printed. More specifically, in the present example, each inkjet head 102 includes a plurality of nozzle rows 122, for example, as shown in FIG. 1B. In this case, the nozzle row 122 can be considered as, for example, a row in which a plurality of nozzles are arranged while shifting positions in a predetermined nozzle row direction. More specifically, in the present example, the nozzle row direction is a direction orthogonal to the main scanning direction (Y direction in the figure), which is the moving direction of the inkjet head 102 at the time of main scan. The main scan can be considered as, for example, an operation and the like of ejecting ink while relatively moving with respect to the medium 50 in a predetermined main scanning direction. Moreover, in the present example, the plurality of nozzles included in each of the nozzle rows 122 are arranged in the nozzle row direction with the positions in the main scanning direction aligned. The plurality of nozzle rows 122 in one inkjet head 102 are arranged in the main scanning direction with the positions in the main scanning direction different from each other. Furthermore, in each of the inkjet heads 102, the plurality of nozzle rows 122 eject ink supplied from any of the ink containers 106 through the ink supply system 108. Thus, the plurality of nozzle rows 122 in one inkjet head 102 eject ink of the same color. In addition, in the present example, each inkjet head 102 is an example of an inkjet head including four or more nozzle rows 122, and includes six (six rows) nozzle rows 122.

The platen 104 is a table-shaped member that holds the medium 50 so as to face the plurality of inkjet heads 102. The plurality of ink containers 106 are containers that store ink to be supplied to the plurality of inkjet heads 102 outside the inkjet head 102. In the present example, each of the plurality of ink containers 106 stores inks of different colors, and supplies the ink to any of the inkjet heads 102 through the ink supply system 108. As the ink container 106, for example, an ink bottle, an ink cartridge, or the like can be suitably used. The ink supply system 108 is configured to include an ink supply path and the like for supplying ink from the plurality of ink containers 106 to the plurality of inkjet heads 102. In the present example, the ink supply system 108 includes a pressure damper and the like, and supplies the ink, whose supply pressure has been adjusted by the pressure damper, to the inkjet head 102. A more specific configuration and the like of the ink supply system 108 will be described in further detail later. The carriage 110 is a holding member that holds the plurality of inkjet heads 102. Furthermore, in the present example, the carriage 110 holds a part of the ink supply system 108 together with the plurality of inkjet heads 102. More specifically, in the present example, the carriage 110 holds a pressure damper and the like in the ink supply system 108. According to such configuration, for example, the pressure damper and the like can be appropriately installed in the vicinity of the inkjet head 102.

The main scan driving unit 112 is a driving unit that causes the plurality of inkjet heads 102 to perform the main scan. In the present example, the main scan driving unit 112 moves the plurality of inkjet heads 102 held by the carriage 110 by moving the carriage 110 in the main scanning direction, and causes the plurality of inkjet heads 102 to perform the main scan. Furthermore, in the main scan, the main scan driving unit 112 causes each nozzle of each inkjet head 102 to eject ink to an ejection position of the ink selected according to an image to be printed. The sub scan driving unit 114 is a driving unit that causes the plurality of inkjet heads 102 to perform the sub scan. The sub scan can be considered as, for example, an operation and the like of relatively moving with respect to the medium 50 in a sub scanning direction (X direction in the figure) orthogonal to the main scanning direction. In the present example, the sub scan driving unit 114 causes the plurality of inkjet heads 102 to carry out the sub scan by conveying the medium 50 in a conveyance direction parallel to the sub scanning direction. The sub scan driving unit 114 changes the range facing the plurality of inkjet heads 102 in the medium 50 by causing the plurality of inkjet heads 102 to perform the sub scan between the main scans. The control unit 120 is, for example, a part including a CPU and the like of the printing apparatus 100, and controls the operation of each unit of the printing apparatus 100 according to a program (e.g., firmware etc.) for controlling the operation of the printing apparatus 100. According to the present example, for example, the operation of printing with respect to the medium 50 can be appropriately executed.

Figure 2A:
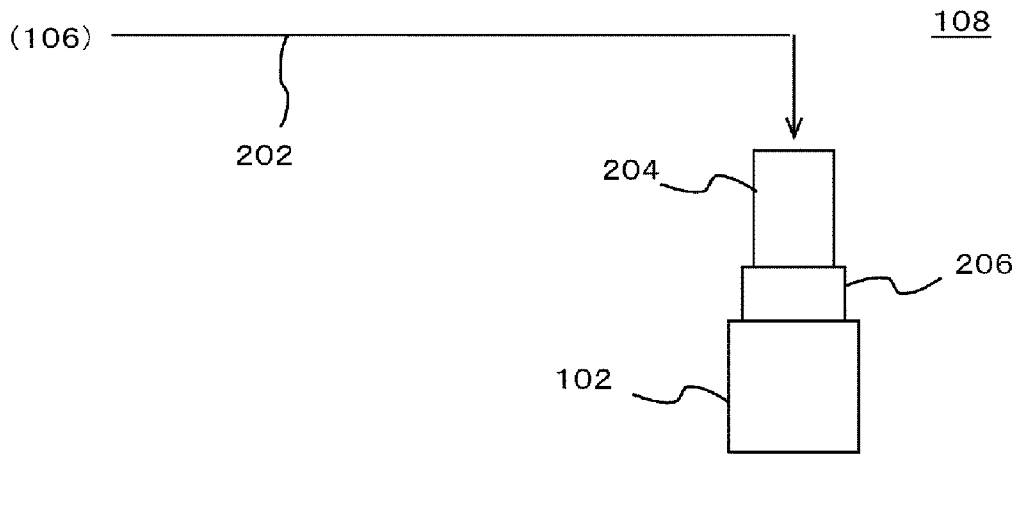
FIGS. 2A to 2C are views describing a more specific configuration and the like of an ink supply system 108.
Figure 2B:
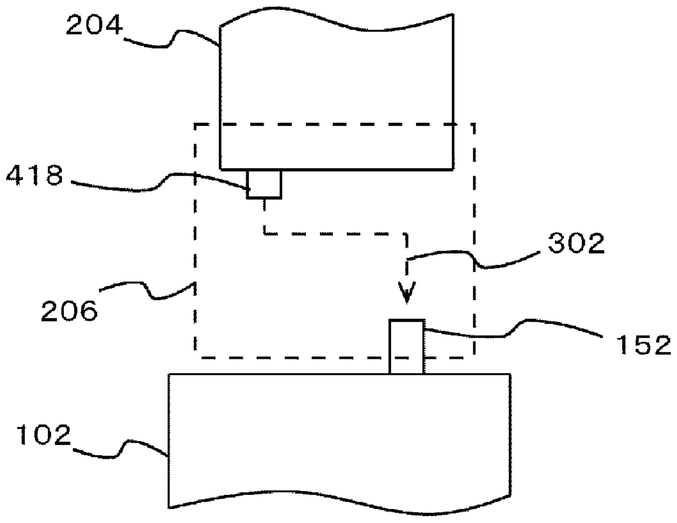
Figure 2C:
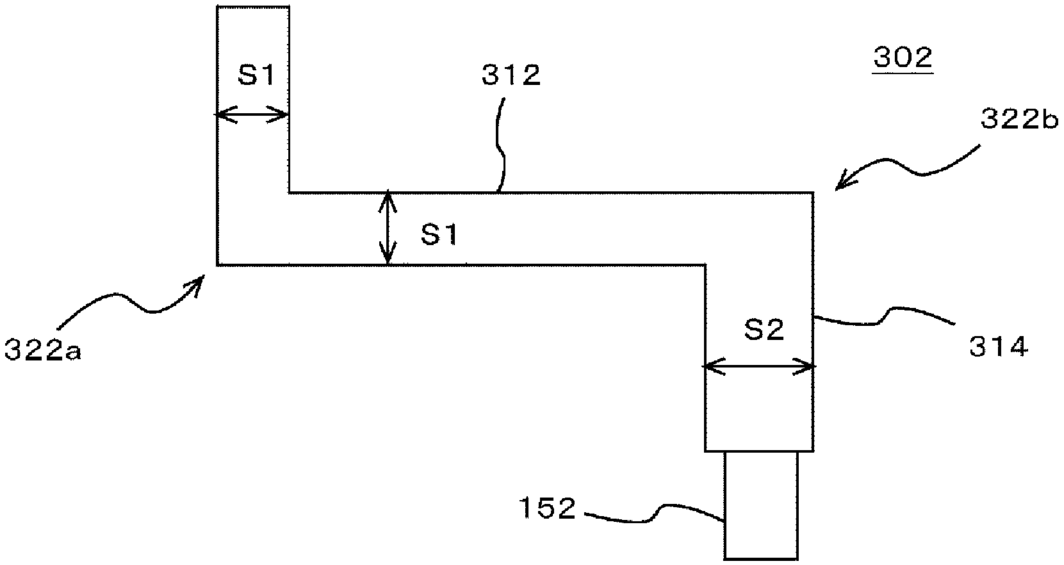

Next, a more specific configuration and the like of the ink supply system 108 in the printing apparatus 100 will be described in further detail. FIGS. 2A to 2C are views describing a more specific configuration and the like of an ink supply system 108. FIG. 2A is a view showing one example of a configuration of the ink supply system 108, and shows an example of a configuration for supplying ink from the ink container 106 to the inkjet head 102, focusing on a path for supplying ink to one of the plurality of inkjet heads 102 in the printing apparatus 100. FIG. 2B is a view showing one example of a configuration of a main part of the ink supply system 108, and shows one example of a configuration of the pressure damper 204 and the connecting member 206 constituting a part of the ink supply system 108 together with the inkjet head 102. FIG. 2C shows one example of a configuration of a flow path 302 in the connecting member 206. In the present example, the ink supply system 108 includes a flow path 202, a pressure damper 204, and a connecting member 206 as a configuration for supplying ink from the ink container 106 to one inkjet head 102.

The flow path 202 is an ink flow path through which ink flows from the ink container 106 to the pressure damper 204. In the present example, the flow path 202 is an example of a container-side flow path, and supplies ink from the ink container 106 to the pressure damper 204 held by the carriage 110 (see FIG. 1A). In this case, the position of the end portion of the flow path 202 on the pressure damper 204 side changes at the time of the main scan. Thus, the flow path 202 can be considered as, for example, a flexible flow path that supplies ink to the pressure damper 204 that moves together with the inkjet head 102. As such a flow path 202, for example, a flexible tube or the like can be suitably used.

The pressure damper 204 is an example of a pressure adjustment mechanism, and adjusts the pressure of the ink supplied to the inkjet head 102. In the present example, the pressure damper 204 adjusts the pressure of the ink received from the ink container 106 through the flow path 202 to a negative pressure in a predetermined range lower than the atmospheric pressure. Then, the ink whose pressure has been adjusted is supplied to the inkjet head 102 through the connecting member 206. More specifically, in the present example, for the ink adjusted to the pressure of the negative pressure in the predetermined range, for example, as shown in FIG. 2B, the pressure damper 204 supplies ink from an output port 418, which is the outlet of the ink connected to the flow path 302 in the connecting member 206, to the flow path 302 in the connecting member 206. In this case, the output port 418 of the pressure damper 204 is an example of a pressure adjustment mechanism outlet. Furthermore, in the present example, the pressure damper 204 is a mechanical pressure damper. In this case, the pressure damper 204 may have, for example, a configuration same as or similar to a known mechanical pressure damper. More specifically, as the pressure damper 204, for example, a configuration or the like same as or similar to the pressure adjusting valve disclosed in Japanese Unexamined Patent Publication No. 2012-232595 can be suitably used. A more specific configuration of the pressure damper 204 will be described in further detail later.

The connecting member 206 is a member that connects the pressure damper 204 and the inkjet head 102. In the present example, the connecting member 206 has a function as a holding member for holding the pressure damper 204, and is disposed on the carriage 110 in the vicinity of the inkjet head 102. In this case, the pressure damper 204 can be considered to be, for example, arranged on the carriage 110 together with the inkjet head 102 and the connecting member 206 by being held by the connecting member 206. Furthermore, in the present example, the connecting member 206 is formed with an ink flow path 302 for flowing ink from the pressure damper 204 to the inkjet head 102. The flow path 302 is an example of a head-side flow path through which ink flows on a side closer to the inkjet head 102 than the pressure damper 204. Furthermore, in the present example, the flow path 302 is an ink flow path whose path is fixed in the connecting member 206, where one end side is connected to the output port 418 of the pressure damper 204, and the other end side is connected to an inlet 152 of ink in the inkjet head 102, so that the ink flows from the pressure damper 204 to the inkjet head 102. As the flow path 302, for example, it is conceivable to use a flow path having at least one bent portion where the direction in which the ink flows changes.

More specifically, in the present example, the flow path 302 includes a plurality of bent portions 322*a* and *b*, for example, as shown in FIG. 2C. The flow path 302 of the present example can also be considered as, for example, a flow path of ink having a first flow path portion 312 and a second flow path portion 314 shown in the figure.

In this case, the first flow path portion 312 can be considered as, for example, a flow path or the like through which the ink flows on the upstream side of the bent portion 322*b*, which is the bent portion at the position closest to the outlet on the inkjet head 102 side in the flow path 302. In the present example, the first flow path portion 312 is a flow path of ink that bends with the bent portion 322*a* interposed therebetween on the upstream side of the bent portion 322*b*. The second flow path portion 314 can be considered as, for example, a flow path through which the ink flows at a position closer to the inkjet head 102 than the first flow path portion 312. In the present example, the second flow path portion 314 is a linear flow path connected to the inlet 152 of the ink in the inkjet head 102. In this case, the second flow path portion 314 can be considered as, for example, a flow path through which the ink flows linearly in a certain direction to the outlet on the inkjet head 102 side in the flow path 302.

In the present example, the second flow path portion 314 is a flow path (thick flow path) having a larger cross-sectional area than the first flow path portion 312 and the output port 418 of the pressure damper 204. More specifically, in the present example, the first flow path portion 312 is a flow path in which a flow path cross-sectional area is a predetermined value S1. In this case, the flow path cross-sectional area can be considered as, for example, a cross-sectional area or the like of the flow path by a plane orthogonal to the direction in which the ink flows. The flow path cross-sectional area can also be considered as, for example, an area indicating the thickness of the flow path. In addition, in the case of a flow path having a bent portion therebetween like the first flow path portion 312, it may be difficult to strictly consider the flow path cross-sectional area at the position of the bent portion. Therefore, the fact that the flow path cross-sectional area of the first flow path portion 312 is S1 can be considered as, for example, that the flow path area of the linear portion in the first flow path portion 312 is S1. In the present example, the flow path cross-sectional area S1 of the first flow path portion 312 is equal to the flow path cross-sectional area of the output port 418 of the pressure damper 204. In this case, the fact that the flow path cross-sectional areas are equal to each other can be considered as, for example, that the flow path cross-sectional areas are substantially equal to each other within an allowable range of a deviation, an error, and the like caused by connecting a plurality of flow paths. In addition, the fact that the flow path cross-sectional area is equal between the output port 418 and the first flow path portion 312 can be considered as, for example, that the design flow path cross-sectional area of the first flow path portion 312 is matched with the flow path cross-sectional area of the output port 418 without intentionally making it different from the flow path cross-sectional area of the output port 418 of the pressure damper 204.

On the contrary, in the present example, the flow path cross-sectional area of the second flow path portion 314 is larger than the flow path cross-sectional area S1 of the first flow path portion 312. More specifically, in the present example, the flow path cross-sectional area of the second flow path portion 314 is a value S2 larger than S1. In this case, the flow path cross-sectional area S2 of the second flow path portion 314 can be considered to be, for example, larger than the flow path cross-sectional area of the output port 418 of the pressure damper 204. In addition, the second flow path portion 314 can also be considered to be, for example, a flow path thicker than the output port 418 and the first flow path portion 312. The configuration in which the second flow path portion 314 is thicker than the first flow path portion 312 can also be considered as, for example, a configuration in which the second flow path portion 314 functions as an ink reservoir in the flow path 302.

Furthermore, the configuration of the flow path 302 of the present example can be considered, for example, to be one example of a configuration in which the flow path cross-sectional area of at least one part of the flow path 302 is larger than the flow path cross-sectional area of the output port 418 of the pressure damper 204. In this case, the fact that the flow path cross-sectional area of at least one part of the flow path 302 is larger than the flow path cross-sectional area of the output port 418 of the pressure damper 204 can be considered as, for example, being substantially large.

Practically, the fact that the flow path cross-sectional area of at least one part of the flow path 302 is larger than the flow path cross-sectional area of the output port 418 of the pressure damper 204 can be considered as, for example, that the flow path cross-sectional area of at least one part of the flow path 302 (e.g., the second flow path portion 314) is larger than or equal to 1.1 times (preferably larger than or equal to 1.2 times) the flow path cross-sectional area of the output port 418 of the pressure damper 204.

Figure 3A:
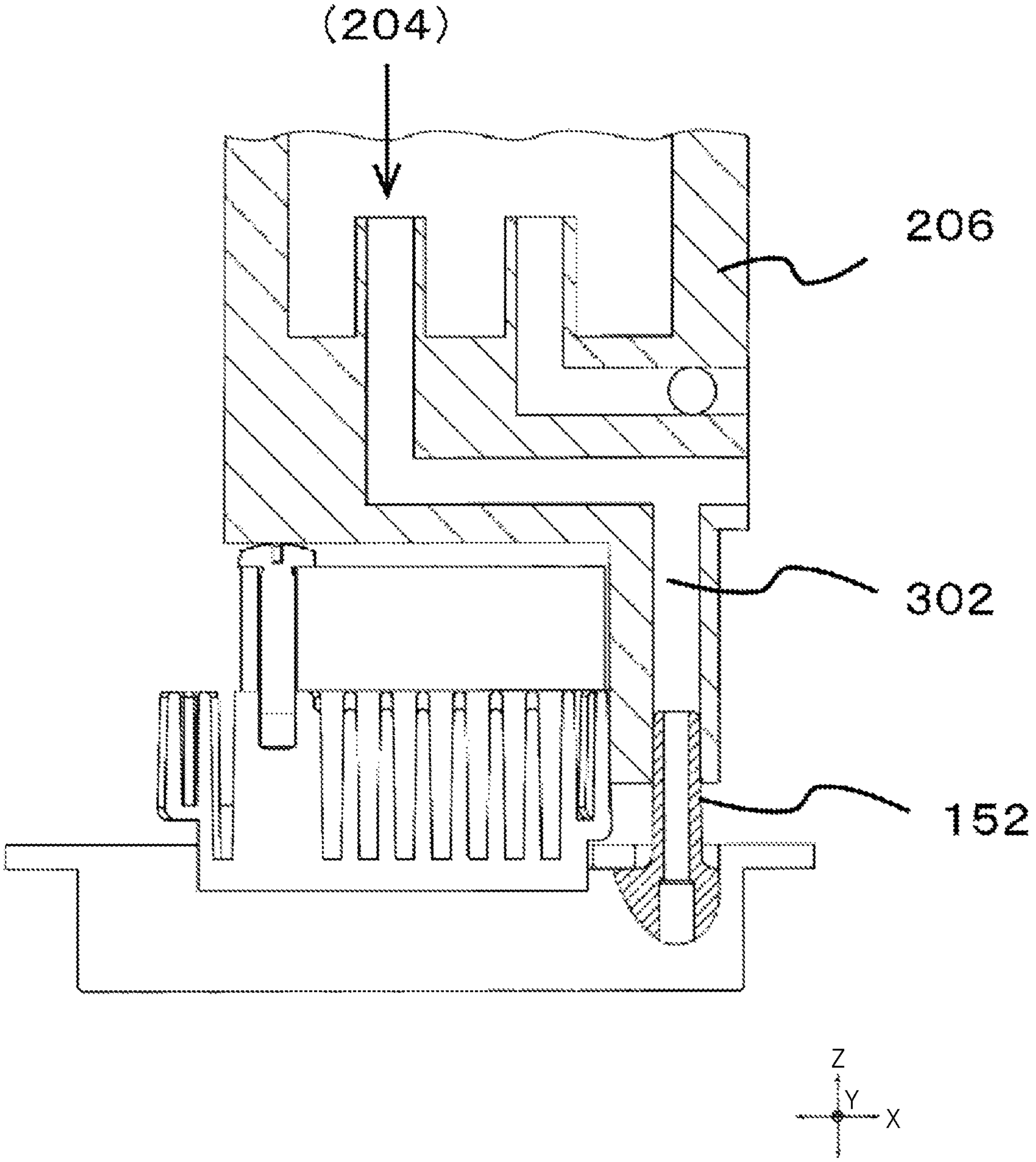
FIGS. 3A and 3B are views specifically showing one example of a configuration of the connecting member 206.
Figure 3B:
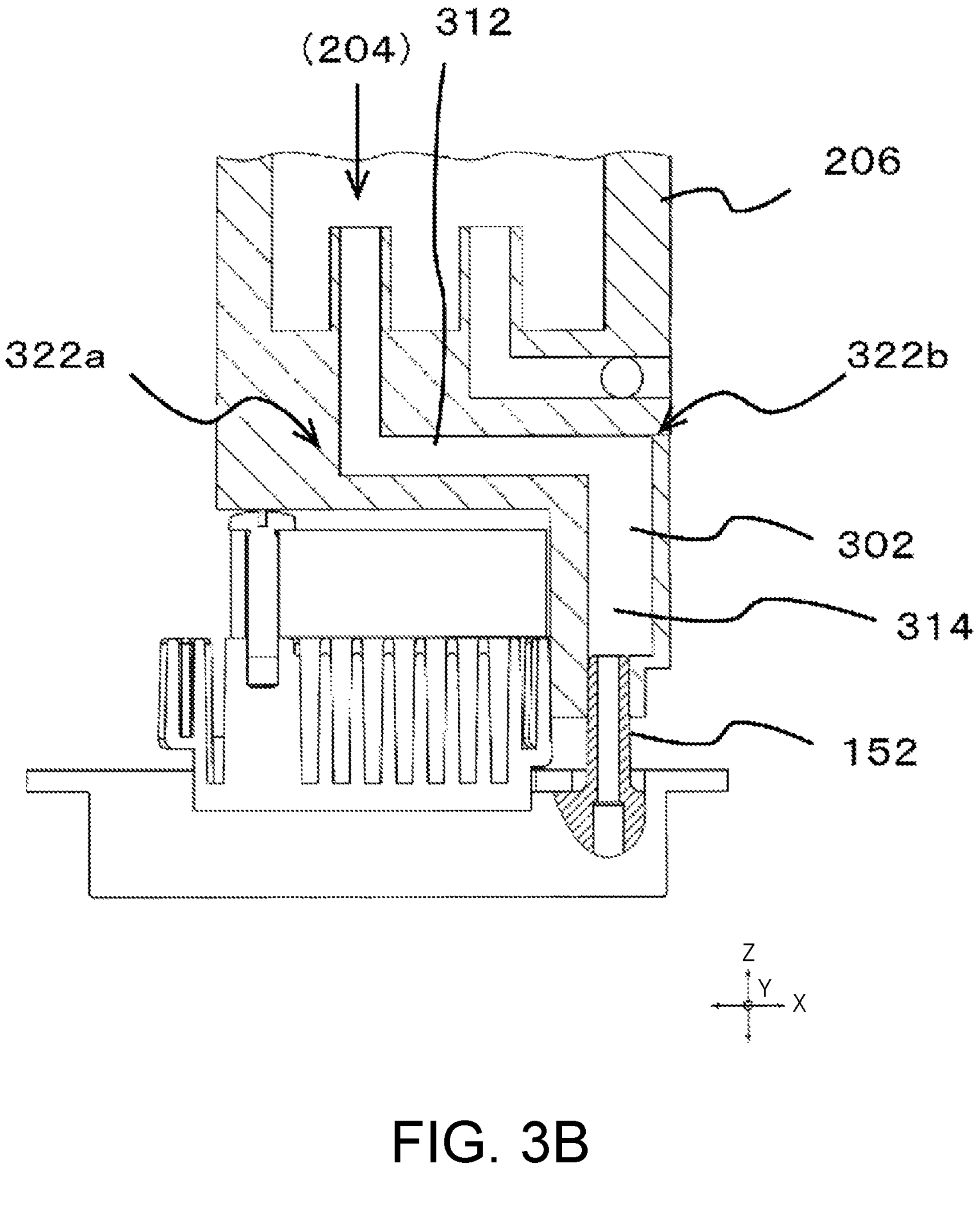

In addition, the features of the flow path 302 in the connecting member 206 of the present example can be more specifically and appropriately understood by comparing with the connecting member 206 having a configuration different from that of the present example, for example, as illustrated in FIGS. 3A and 3B. FIGS. 3A and 3B are views specifically showing one example of a configuration of the connecting member 206.

FIG. 3A shows a configuration of the connecting member 206 different from that of the present example. FIG. 3B shows one example of a configuration of the connecting member 206 of the present example. Hereinafter, for the sake of convenience of explanation, the connecting member 206 illustrated in FIG. 3A is referred to as a conventional connecting member 206. FIG. 3B can be considered as, for example, a view more specifically illustrating the configuration of the connecting member 206 illustrated in FIG. 2A.

As illustrated in FIG. 3A, the conventional connecting member 206 can be considered, for example, to have a constant flow path cross-sectional area over the entire flow path 302. In this case, the constant flow path cross-sectional area can be considered to be an area that matches the flow path cross-sectional area of the output port of the pressure damper 204. On the other hand, in the connecting member 206 of the present example illustrated in FIG. 3B, as described above, the flow path cross-sectional area of the second flow path portion 314 in the flow path 302 is larger than the flow path cross-sectional area of the output port of the pressure damper 204 and the first flow path portion 312. In this case, for the connecting member 206 of the present example, for example, it can be considered that the flow path cross-sectional area of the second flow path portion 314 in the flow path 302 is made larger than the flow path cross-sectional area of the flow path 302 in the conventional connecting member 206. Furthermore, the configuration of the flow path 302 of the present example can be considered, for example, to be one example of a configuration in which the flow path cross-sectional area of at least one part of the flow path 302 is larger than the flow path cross-sectional area of the output port of the pressure damper 204. Moreover, this configuration can be considered, for example, to be one example of a configuration in which the flow path cross-sectional area of at least one part of the second flow path portion 314 is larger than the flow path cross-sectional area of the output port of the pressure damper 204.

Furthermore, in this case, in the connecting member 206 of the present example, the flow path cross-sectional area of at least one part of the flow path 302 is increased, so that for example, the ink can be more appropriately supplied to the inkjet head 102, and high quality printing can be performed. More specifically, in the present example, by increasing the flow path cross-sectional area of at least one part of the flow path 302 connecting the pressure damper 204 and the inkjet head 102, for example, when the amount of ink required in the inkjet head 102 is changed, the ink can be more appropriately supplied to the inkjet head 102 even when the change in the amount of ink coming out from the output port of the pressure damper 204 is delayed. Furthermore, in this case, for example, such an effect can be more appropriately obtained by increasing the flow path cross-sectional area of the second flow path portion 314 in the flow path 302. Therefore, technical meanings and the like regarding the configuration of the connecting member 206 of the present example will be described in detail below. As described in detail below, the configuration of the connecting member 206 of the present example is related to using the pressure damper 204. Thus, first, a specific configuration of the pressure damper 204 will be described.

Figure 4:
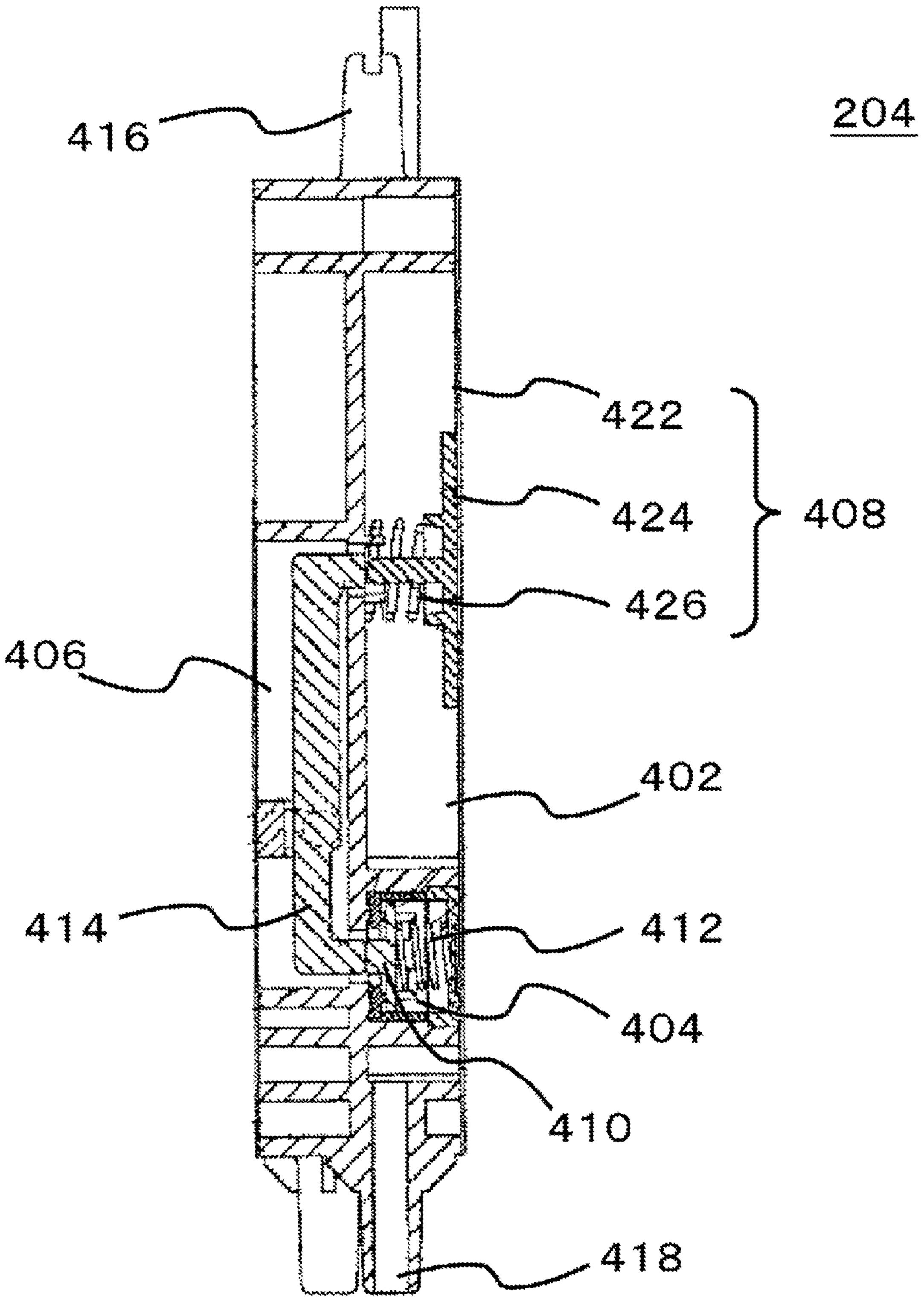
FIG. 4 is a view showing one example of a specific configuration of a pressure damper 204.

FIG. 4 shows one example of a specific configuration of the pressure damper 204. As described above, the pressure damper 204 is a mechanical pressure damper. In this case, the mechanical pressure damper can be considered as, for example, a pressure adjustment mechanism or the like that adjusts the pressure only with a passive component. The passive component can be considered as, for example, a component that does not require supply of energy such as power. The mechanical pressure damper can also be considered as, for example, a pressure adjustment mechanism or the like that adjusts the pressure without using a pump that receives supply of energy such as power. Furthermore, in the present example, the pressure damper 204 includes a negative pressure chamber 402, a pressure chamber 404, a communication flow path chamber 406, a pressure adjusting unit 408, a valve 410, a spring 412, an operating rod 414, an input port 416, and an output port 418.

Each of the negative pressure chamber 402, the pressure chamber 404, and the communication flow path chamber 406 is configured to be a part of an in-adjustment mechanism flow path, which is a flow path of ink in the pressure damper 204. In this case, the in-adjustment mechanism flow path can be considered as, for example, a flow path of ink that causes the ink supplied from the ink container 106 (see FIG. 1) to flow toward the inkjet head 102 (see FIG. 1A) in the pressure damper 204. Furthermore, in the present example, the fact that the in-adjustment mechanism flow path flows the ink toward the inkjet head 102 can be considered as, for example, outputting the ink from the output port 418 to the connecting member 206 (see FIG. 2A). Furthermore, among these configurations, the negative pressure chamber 402 is an example of an ink storage unit that stores ink in the middle of the in-adjustment mechanism flow path, and stores the ink supplied from the ink container 106 through the input port 416 on the upstream side of the pressure chamber 404 and the communication flow path chamber 406 in the direction in which the ink flows in the in-adjustment mechanism flow path. Furthermore, in the present example, the negative pressure chamber 402 is a storage unit having an opening, and stores the ink in a state where the opening is covered by a flexible film 422 in the pressure adjusting unit 408. As a result, the negative pressure chamber 402 stores the ink whose pressure has been adjusted by the pressure adjusting unit 408. The negative pressure chamber 402 stores the ink supplied from the ink supply system 108 by being connected to the ink flow path 202 (see FIG. 2A) through the input port 416. Furthermore, in the present example, the negative pressure chamber 402 has an opening serving as an ink flow path on the side opposite to the opening covered by the flexible film 422, and is connected to the communication flow path chamber 406 through the opening.

The pressure chamber 404 is a storage unit that stores ink on the downstream side of the pressure chamber 404 and the communication flow path chamber 406 in the direction in which the ink flows in the in-adjustment mechanism flow path. Furthermore, in the present example, the pressure chamber 404 is connected to the inkjet head 102 through the output port 418 and the connecting member 206 by storing ink at the preceding stage of the output port 418. Furthermore, the pressure of the ink in the pressure chamber 404 thus becomes a state of being balanced with the pressure of the ink in the inkjet head 102. In this case, the pressure of the ink in the inkjet head 102 is, for example, the pressure of the ink in the ink chamber that stores the ink at the preceding stage of the nozzle in the inkjet head 102. In addition, in the present example, the pressure chamber 404 is connected to the communication flow path chamber 406 through the opening, and is connected to the negative pressure chamber 402 through the opening and the communication flow path chamber 406. Furthermore, a valve 410 is provided in an opening between pressure chamber 404 and communication flow path chamber 406. The communication flow path chamber 406 is a space serving as a flow path connecting the negative pressure chamber 402 and the pressure chamber 404. In the present example, the communication flow path chamber 406 accommodates the operating rod 414 interlocked with the valve 410.

The pressure adjusting unit 408 is configured to adjust the pressure of the ink stored in the negative pressure chamber 402 to a pressure of a predetermined negative pressure lower than the atmospheric pressure. In the present example, the pressure adjusting unit 408 includes a flexible film 422, a pressure receiving member 424, and a spring 426. The flexible film 422 is a film having flexibility and covers the opening of the negative pressure chamber 402 as described above. More specifically, in the present example, the flexible film 422 is a film having an air shielding property, and covers the opening of the negative pressure chamber 402 in a state where the side opposite to the negative pressure chamber 402 comes into contact with the atmosphere. As the flexible film 422, for example, a film made of resin and the like can be suitably used. The pressure receiving member 424 is a member that receives a force received by the flexible film 422 from the surroundings, and is integrally joined to a surface of the flexible film 422 on the negative pressure chamber 402 side so as to receive a force in a direction of pushing the flexible film 422 outward from the spring 426. In this case, for example, it can be considered that the pressure receiving member 424 receives a force corresponding to the atmospheric pressure through the flexible film 422, and receives the biasing force of the spring 426 and a force corresponding to the pressure of the ink from the ink in the negative pressure chamber 402 in a direction opposite to this force. Furthermore, in the present example, the pressure receiving member 424 includes a bar-shaped pressure receiving transmission portion passing through an opening between the negative pressure chamber 402 and the communication flow path chamber 406, and transmits a force received by the pressure receiving member 424 from the surroundings to the operating rod 414 by engaging the pressure receiving transmission portion and the operating rod 414 through the opening. The spring 426 is an example of a biasing unit, and applies a force in a direction of pushing the flexible film 422 outward to the pressure receiving member 424 to bias the flexible film 422 in a direction away from the negative pressure chamber 402.

When configured in such manner, as described above, the outer surface of the flexible film 422 receives a force corresponding to the atmospheric pressure. Furthermore, the inner surface of the flexible film 422 receives the biasing force of the spring 426 received through the pressure receiving member 424 and the force corresponding to the pressure of the ink in the negative pressure chamber 402. In this case, it can be considered that the pressure of the ink in the negative pressure chamber 402 becomes, for example, a predetermined negative pressure determined according to the biasing force of the spring 426 as the forces received by the outer side and the inner side of the flexible film 422 are balanced. Furthermore, regarding the pressure adjusting unit 408, for example, it can be considered that the pressure of the ink stored in the negative pressure chamber 402 is adjusted to a pressure lower than the atmospheric pressure by biasing the flexible film 422 by the spring 426.

The valve 410 is an opening/closing unit that opens and closes an opening between pressure chamber 404 and communication flow path chamber 406. The valve 410 can also be considered to be disposed, for example, between the negative pressure chamber 402 and the inkjet head 102 in the in-adjustment mechanism flow path. Furthermore, in the present example, the valve 410 is a valve that is closed by moving in a direction from the pressure chamber 404 toward the communication flow path chamber 406 and is opened by moving in the opposite direction, and receives a force from the operating rod 414 on the communication flow path chamber 406 side and receives a biasing force of the spring 412 on the pressure chamber 404 side. In this case, for example, it can be considered that the valve 410 further receives a force corresponding to the pressure of the ink stored in each of the communication flow path chamber 406 and the pressure chamber 404 on the respective side of the communication flow path chamber 406 and the pressure chamber 404. In the present example, the spring 412 is disposed in the pressure chamber 404 and biases the valve 410 in a direction of closing the valve 410. On the other hand, the operating rod 414 applies a force in a direction of opening the valve 410 to the valve 410 from the side of the communication flow path chamber 406. In addition, as can be understood from the configuration illustrated in FIG. 4 and the like, the operating rod 414 applies a force corresponding to the force transmitted from the pressure receiving member 424 to the valve 410. More specifically, in the present example, the operating rod 414 is a member having arms that swing on one side and the other side of the swing fulcrum with respect to the swing fulcrum, and the force transmitted from the pressure receiving member 424 is converted at a ratio determined according to the lengths of the arms on one side and the other side, and applied to the valve 410. As a result, the operating rod 414 applies a force corresponding to the pressure of the ink having a negative pressure in the negative pressure chamber 402 to the valve 410.

Furthermore, as described above, in the present example, the pressure of the ink in the pressure chamber 404 thus becomes a state of being balanced with the pressure of the ink in the inkjet head 102. Therefore, on the pressure chamber 404 side, the valve 410 receives a force corresponding to the pressure of the ink in the inkjet head 102 and the biasing force of the spring 412. In this case, in a state where the pressure of the ink in the inkjet head 102 is higher than the predetermined pressure, the force in the direction of closing the valve 410 becomes dominant, and the valve 410 is in a closed state. Furthermore, for example, when the ink is consumed in the inkjet head 102 and the pressure of the ink in the inkjet head 102 is lowered, the force in the direction of closing the valve 410 becomes weaker, so that the force in the direction of opening the valve 410 becomes dominant and the valve 410 opens. As a result, the ink adjusted to the negative pressure in the negative pressure chamber 402 flows into the pressure chamber 404 through the communication flow path chamber 406. Furthermore, the ink that has flowed into the pressure chamber 404 is supplied to the inkjet head 102 through the output port 418 and the connecting member 206. Moreover, in a case where a sufficient amount of ink is supplied to the inkjet head 102 and the pressure of the ink in the inkjet head 102 is increased, the valve 410 is closed and the supply of the ink to the inkjet head 102 is stopped. In this case, the valve 410 can be considered to open and close according to, for example, the difference between the pressure of the ink on the inkjet head 102 side and the pressure of the ink in the negative pressure chamber 402 in the in-adjustment mechanism flow path. Furthermore, the valve 410 can be considered to flow the ink adjusted to a pressure in a predetermined range toward the inkjet head 102 by such an opening/closing operation.

The input port 416 is an inlet for ink to receive the ink supplied from the ink container 106. The output port 418 is an outlet for ink to output the ink toward the connecting member 206. Furthermore, as can be understood from the above description and the like, in the present example, the output port 418 is connected to the pressure chamber 404, and outputs the ink supplied from the pressure chamber 404 toward the connecting member 206. According to the present example, for example, the pressure of the ink supplied to the inkjet head 102 can be appropriately adjusted by the pressure damper 204. Thus, for example, the ink adjusted to the pressure of the negative pressure in the predetermined range lower than the atmospheric pressure can be appropriately supplied to the inkjet head 102.

Therefore, technical meanings and the like regarding the configuration of the connecting member 206 of the present example will be described in detail below. According to the present example, for example, the pressure of the ink supplied to the inkjet head 102 can be adjusted by using the pressure damper 204. In this case, by using the mechanical pressure damper 204, it is also possible to realize downsizing and cost reduction of the device. However, depending on the configuration, operation, and the like of the printing apparatus 100 (see FIG. 1A), the use of the pressure damper 204 may cause a problem in the quality of printing.

In this regard, the inventor of the present application has found that, in the case where printing is performed with the conventional configuration, when printing an image like a barcode (hereinafter referred to as a barcode-like image) in which vertical lines having a predetermined width (e.g., a line width of 2 mm or less) extending in the main scanning direction are repeatedly arranged with a predetermined margin (e.g., a margin of 2 mm or less), unintended ink spray may occur and the print quality may be affected. Furthermore, it has been found that, in the case where so-called solid printing is performed, an unintended stripe may occur at the timing of the start of drawing or the timing of the end of drawing near the end of the region to be painted, and the quality of printing may be affected. Furthermore, regarding such a phenomenon, various experiments and the like were conducted to confirm that it is a phenomenon that occurs regardless of the type of ink (e.g., solvent ink, aqueous ink, UV ink, etc.) although there is a difference in degree, and that it does not occur when the moving speed (scan speed) of the inkjet head 102 at the time of the main scan is sufficiently slowed or when the pass number of printing is sufficiently increased, and the like. However, when the scan speed is slowed or the pass number is increased, the printing speed is greatly reduced. On the other hand, in the present example, high quality printing can be more appropriately performed even when printing is performed at a printing speed at which a problem occurs in the conventional configuration, by using the connecting member 206 having the configuration described above. In the following, this point will be described in detail focusing on the operation in the case of performing solid printing.

Figure 5A:
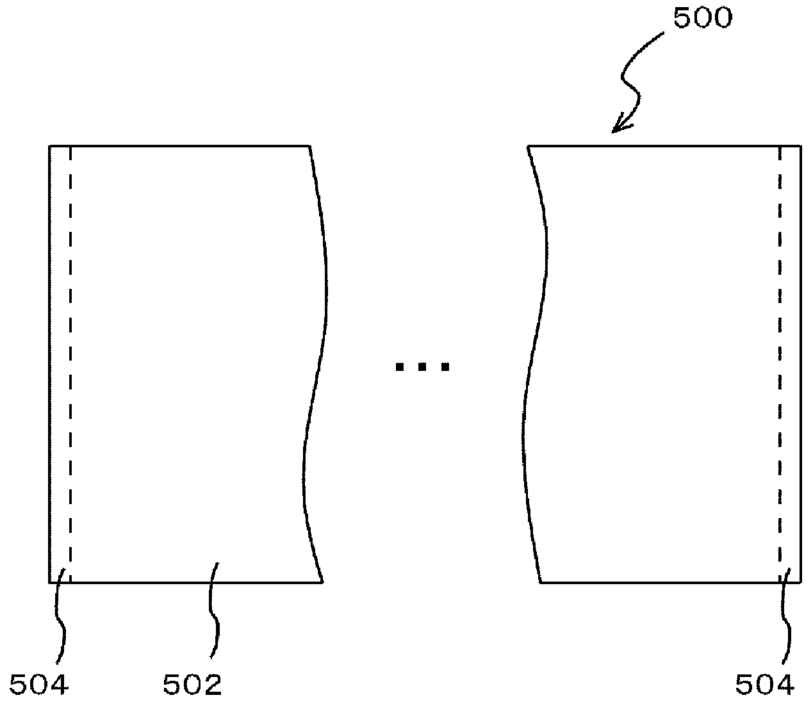
Figure 5B:
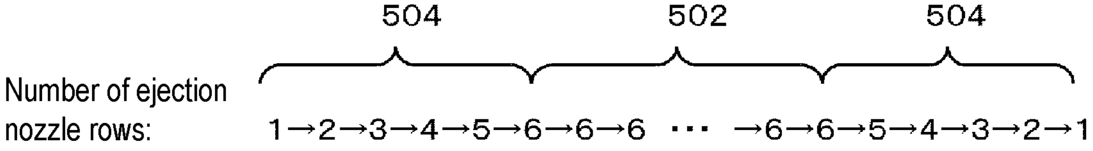

FIGS. 5A to 5C are views describing in detail the operation and the like of carrying out solid printing. FIG. 5A shows an example of a solid print region 500 which is a region where ink is ejected in a medium when solid printing is carried out. In this case, the solid printing can be considered as, for example, an operation of ejecting ink from any nozzle in the inkjet head 102 with respect to all ejection positions set according to the resolution of printing. Furthermore, the solid printing can be considered as, for example, an operation of ejecting ink from any nozzle of a plurality of nozzle rows in the inkjet head 102 with respect to the ejection position in the solid print region 500. Ejecting ink from the nozzle to the ejection position can be considered as, for example, ejecting ink so that ink dots of a predetermined size are formed with respect to the designed ejection position. Furthermore, the solid printing can be considered as, for example, setting the density of printing with the ink of one color to the density of 100% set in advance, and the like.

As described above, in the present example, the inkjet head 102 includes six nozzle rows. In this case, the six nozzle rows in one inkjet head 102 can be considered as a nozzle row or the like to which ink is supplied from the outside of the inkjet head 102 through a common path. Furthermore, the six nozzle rows in one inkjet head 102 can be considered as, for example, a nozzle row that ejects ink of the same color supplied from the pressure damper 204 (see FIG. 2A) through one flow path 302 (see FIG. 2C) in the connecting member 206, and the like. In this case, in the operation of solid printing, the main scan driving unit 112 (see FIG. 1A) basically moves the inkjet head 102 in the main scanning direction while simultaneously ejecting ink from all the nozzle rows in one inkjet head 102. However, at the timing of the start of drawing or the timing of the end of drawing near the end of the region to be painted by solid printing, the main scan driving unit 112 causes the ink to be ejected from only some nozzle rows in the inkjet head 102. Therefore, the solid print region 500 can be considered as, for example, a region including the non-end region 502 and the end region 504, for example, as illustrated in the figure.

The non-end region 502 is a region excluding a portion at the end in the main scanning direction in the solid print region 500. In the illustrated configuration, the non-end region 502 can be considered as a region other than the end region 504 in the solid print region 500, or the like. Furthermore, in the present example, the non-end region 502 is a region drawn by ejecting ink from all the nozzle rows in one inkjet head 102. In this case, the non-end region 502 can be considered as, for example, an example of a nozzle row number constant region where the number of ejection nozzle rows, which is the number of nozzle rows that simultaneously eject ink at the time of main scan, does not change. The number of ejection nozzle rows can be considered as, for example, the number of nozzle rows that simultaneously eject ink in one inkjet head 102 that ejects ink in the operation of solid printing. Furthermore, in the present example, the number of ejection nozzle rows can be considered as, for example, the number of nozzle rows that simultaneously eject ink among a plurality of nozzle rows that receives the supply of ink from the common pressure damper 204 in one inkjet head 102, and the like. Moreover, the end region 504 is a region corresponding to the timing to start drawing or end drawing in solid printing. The solid print region 500 has an end region 504 on each of the one side and the other side in the main scanning direction. Furthermore, at the time of executing solid printing, in the vicinity of the end of the solid print region 500 in the main scanning direction, the number of ejection nozzle rows changes with the movement of the inkjet head 102 in the main scanning direction in the main scan. In the present example, such a region near the end is the end region 504. In this case, the end region 504 can be considered as, for example, an example of a nozzle row number changing region where the number of ejection nozzle rows changes.

In the present example, the number of ejection nozzle rows changes, as shown, for example, in FIG. 5B.

FIG. 5B shows one example of a change in the number of ejection nozzle rows accompanying the movement of the inkjet head 102 in the main scan. As shown in the figure, when solid printing is executed, the number of ejection nozzle rows gradually increases in the end region 504 on the drawing-start side. In the non-end region 502, the number of ejection nozzle rows is a constant number. In the end region 504 on the drawing-end side, the number of ejection nozzle rows gradually decreases. As described above, when solid printing is executed, it is conceivable that the number of ejection nozzle rows changes by the timing at the time of the main scan in the end region 504.

Furthermore, to appropriately perform solid printing, the main scan is performed under a condition in which at least the ink required for the number of ejection nozzle rows in the non-end region 502 can be supplied to the inkjet head 102. In this case, the amount of ink that can be supplied to the inkjet head 102 in the non-end region 502 can be considered to be determined, for example, according to the ink supply capacity in the pressure damper 204. Furthermore, the amount of ink required in the inkjet head 102 at the time of the main scan can be considered as, for example, an amount of ink consumed in the inkjet head 102 per unit time, and the like. The amount of ink consumed by the inkjet head 102 per unit time can be considered to increase, for example, as the moving speed of the inkjet head 102 at the time of the main scan becomes faster. Therefore, the moving speed of the inkjet head 102 at the time of the main scan needs to be determined in consideration of at least the amount of ink required in the inkjet head 102 in the non-end region 502 and the ink supply capacity of the pressure damper 204. Furthermore, in this case, in the main scan, the main scan driving unit 112 (see FIG. 1A) moves the inkjet head 102 at least at a speed at which the ink can be supplied from the pressure damper 204 to all the nozzle rows in the inkjet head 102 in the non-end region 502 at the time of executing the solid printing.

However, as described above, at the time of executing the solid printing, the number of ejection nozzle rows gradually changes in the non-end region 502. In this case, the amount of ink required in the inkjet head 102 also gradually changes with the change in the number of ejection nozzle rows. On the other hand, as can be understood from the configuration of the pressure damper 204 and the like described above, in the pressure damper 204 of the present example, the amount of ink output from the output port 418 (see FIG. 4) is changed by a mechanical operation accompanying opening/closing of the valve 410 (see FIG. 4) and the like. In this case, if the change in the amount of ink required in the inkjet head 102 is fast, the change in the amount of ink output from the pressure damper 204 may not be in time even if there is a margin in the ink supply capacity of the pressure damper 204. In this case, the fact that the change in the amount of ink output from the pressure damper 204 cannot be made in time can be considered, for example, as the output of the pressure damper 204 being delayed with respect to the change in the amount of ink required in the inkjet head 102 thus degrading the quality of printing, and the like. In this regard, the inventor of the present application conducted various experiments using a plurality of configurations in which the pressure damper 204 and the inkjet head 102 are connected in different manners, for example, as shown in FIG. 5C. Then, it was confirmed that the problem of spray that occurs when printing the barcode-like image described above and the problem of stripes that occurs at the time of executing solid printing are degradation in the quality of printing caused in relation to the change in the amount of ink coming out from the pressure damper 204 not being in time.

FIG. 5C shows some results of experiments conducted using a plurality of configurations in which the pressure damper 204 and the inkjet head 102 are connected in different manners. Among the configurations shown in the figure, the configuration of the present example is a configuration in which the pressure damper 204 and the inkjet head 102 are connected using the connecting member 206 having the configuration described using FIGS. 2 and 3B, and the like. The configuration of the present example can also be considered as, for example, a configuration in which a part of the flow path 302 in the connecting member 206 is formed thicker than the output port 418 of the pressure damper 204. Among the configurations shown in the figure, the conventional configuration is a configuration in which the pressure damper 204 and the inkjet head 102 are connected using the connecting member 206 having the configuration shown in FIG. 3A. The conventional configuration can also be considered as, for example, a configuration in which the thickness at each position of the flow path 302 in the connecting member 206 is formed to the same thickness as the output port 418 of the pressure damper 204. The direct-coupled configuration is a configuration in which the pressure damper 204 and the inkjet head 102 are connected without using the connecting member 206. More specifically, in the direct-coupled configuration, the output port 418 of the pressure damper 204 and the inkjet head 102 are connected using a flexible tube having the same thickness as the output port 418 of the pressure damper 204. Furthermore, in this experiment, the moving speed of the inkjet head 102 at the time of the main scan was set to a predetermined speed at which ink can be supplied from the pressure damper 204 to all the nozzle rows in the inkjet head 102 at the time of drawing the non-end region 502 in the solid print region 500.

Furthermore, among the items shown in the figure, the item of spray indicates whether or not unintended ink spray has occurred when printing a barcode-like image in which vertical lines having a line width of about 2 mm are repeated with a margin of about 2 mm. The item of stripe indicates whether or not an unintended stripe has occurred when executing solid printing using any one of the inkjet heads 102 at a predetermined printing resolution. As shown in the figure, when printing is performed with the configuration of the present example, printing can be appropriately performed without causing the occurrence of spray and stripes that become problems. On the other hand, when printing is performed with the conventional configuration, an unintended small spray occurred and the quality of printing degraded in the printing of the barcode-like image. At the time of executing the solid printing, an unintended stripe generated near the end of the solid print region 500, and the quality of printing degraded. These stripes are stripes extending in the sub scanning direction, and are arranged at constant intervals in the main scanning direction. Furthermore, in this experiment, even in the direct-coupled configuration that does not use the connecting member 206, printing of a barcode-like image and solid printing were executed. In this case as well, as in the case where the conventional configuration is used, an unintended small spray occurred at the time of executing printing of the barcode-like image, and the quality of printing was degraded. At the time of executing the solid printing, an unintended stripe generated near the end of the solid print region 500, and the quality of printing was degraded.

Here, the inventor of the present application carried out the printing using each configuration described above by changing the moving speed of the inkjet head 102 in the main scan in a plurality of stages. Then, it was confirmed that the problem of spray and stripes as described above did not occur when the moving speed of the inkjet head 102 was reduced. In addition, through various experiments including the experiments described above, it was confirmed that the problem of the spray and the stripes described above that occurred in the conventional configuration and the direct-coupled configuration is caused by the fact that the change in the amount of ink coming out from the output port 418 of the pressure damper 204 is not in time with the change in the number of ejection nozzle rows.

On the other hand, when the connecting member 206 of the configuration of the present example is used, at least a part of the flow path 302 of the connecting member 206 is made thick, so that for example, the ink can be stored at a position closer to the inkjet head 102 than the pressure damper 204 with a margin with respect to the flow rate of the ink coming out from the output port 418 of the pressure damper 204. Thus, for example, in a case where the amount of ink required in the inkjet head 102 is changed, for example, even when a delay occurs in the change in the amount of ink coming out from the output port 418 of the pressure damper 204, a required amount of ink can be quickly and appropriately supplied to the inkjet head 102. Therefore, when the connecting member 206 of the configuration of the present example is used, for example, the ink can be appropriately supplied to each nozzle of the respective nozzle row in the inkjet head 102 even at the timing when the change in the amount of ink coming out from the output port 418 of the pressure damper 204 is not in time with the change in the number of ejection nozzle rows. Furthermore, in this case, for the moving speed of the inkjet head 102 at the time of the main scan, for example, it can be considered that a problem occurs in the conventional configuration and the direct-coupled configuration, and the printing can be appropriately carried out in the configuration of the present example. Thus, according to the present example, for example, the moving speed of the inkjet head 102 at the time of the main scan can be appropriately increased while appropriately preventing the problem from occurring in the quality of printing due to the influence of the pressure damper 204. This allows, for example, high speed and high quality printing to be appropriately carried out.

Furthermore, in this case, when focusing on the change in the amount of ink coming out from the output port 418 of the pressure damper 204, the moving speed of the inkjet head 102 at the time of the main scan can be considered to be, for example, a speed at which the change in the amount of ink coming out from the output port 418 of the pressure damper 204 is not in time with respect to the change in the number of ejection nozzle rows. In this case, the fact that the change in the amount of ink coming out from the output port 418 of the pressure damper 204 is not in time with respect to the change in the number of ejection nozzle rows can be considered to be, for example, the change in the amount of ink coming out from the output port 418 of the pressure damper 204 not meeting the change in the number of ejection nozzle rows in the end region 504 on at least either side in the main scanning direction at the time of execution of solid printing. Furthermore, in this case, the flow path 302 of the connecting member 206 can be considered to function as, for example, a buffer with respect to the flow rate of ink as at least one part is formed thicker. More specifically, in this case, since the flow path cross-sectional area of at least one part of the flow path 302 in the connecting member 206 of the configuration of the present example is larger than the flow path cross-sectional area of the output port 418 of the pressure damper 204, the flow path 302 can be considered to function as, for example, a buffer that adjusts the flow rate of ink between the output port 418 of the pressure damper 204 and the inkjet head 102. Furthermore, in this case, when the change in the amount of ink coming out from the output port 418 of the pressure damper 204 is not in time with respect to the change in the number of ejection nozzle rows, the flow path 302 in the connecting member 206 of the configuration of the present example can be considered to, for example, supply ink of an amount required by the nozzle row that ejects the ink to the nozzle row of the inkjet head 102.

Furthermore, a configuration of supplying ink from the pressure damper 204 to the inkjet head 102 using the connecting member 206 having the flow path 302 in which the flow path cross-sectional area of at least one part is larger than the flow path cross-sectional area of the output port 418 of the pressure damper 204 as in the connecting member 206 of the configuration of the present example can be considered as, for example, an example of the first ink supply configuration. In this case, considering a configuration using a flow path in which the flow path cross-sectional area is smaller than or equal to the flow path cross-sectional area of the output port 418 of the pressure damper 204 at all positions as the flow path for supplying ink from the pressure damper 204 to the inkjet head 102 as the second ink supply configuration, the features of the moving speed of the inkjet head 102 at the time of the main scan and the operation of supplying the ink to the inkjet head 102 through the connecting member 206 can also be considered focusing on the difference between the first ink supply configuration and the second ink supply configuration. More specifically, in this case, for example, focusing on the end region 504 on the side in which the number of ejection nozzle rows gradually increases among the plurality of end regions 504 in the solid print region 500, the moving speed of the inkjet head 102 at the time of the main scan can be considered as, for example, a speed at which the ink to be supplied to the nozzle row from which the ink is to be ejected becomes short at least at some timings when the ink is supplied to the inkjet head 102 in the second ink supply configuration. Furthermore, in this case, in the connecting member 206 of the configuration of the present example, the ink can be supplied to the inkjet head 102 so that shortage of ink to be supplied to the nozzle row from which the ink is to be ejected does not occur in the end region 504 on the side where the number of ejection nozzle rows gradually increases by supplying the ink to the inkjet head 102 in the first ink supply configuration.

Figure 6A:
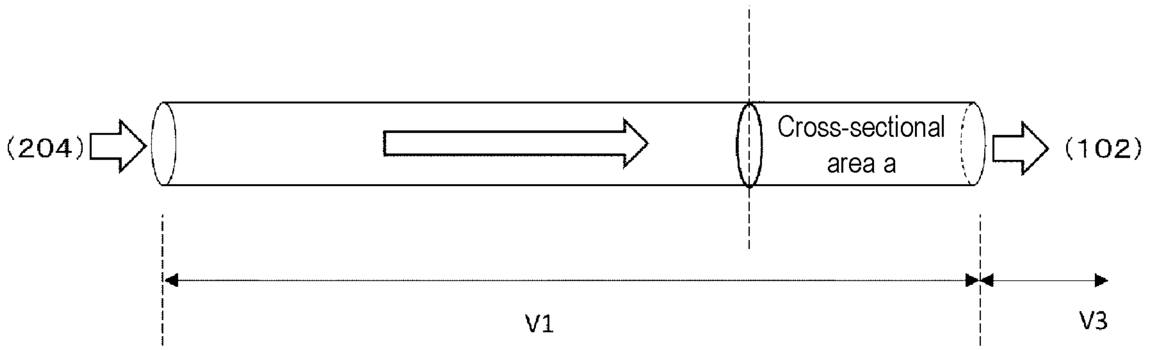
FIGS. 6A and 6B are views describing a flow velocity of an ink flowing through the flow path 302 in a simplified manner.
Figure 6B:
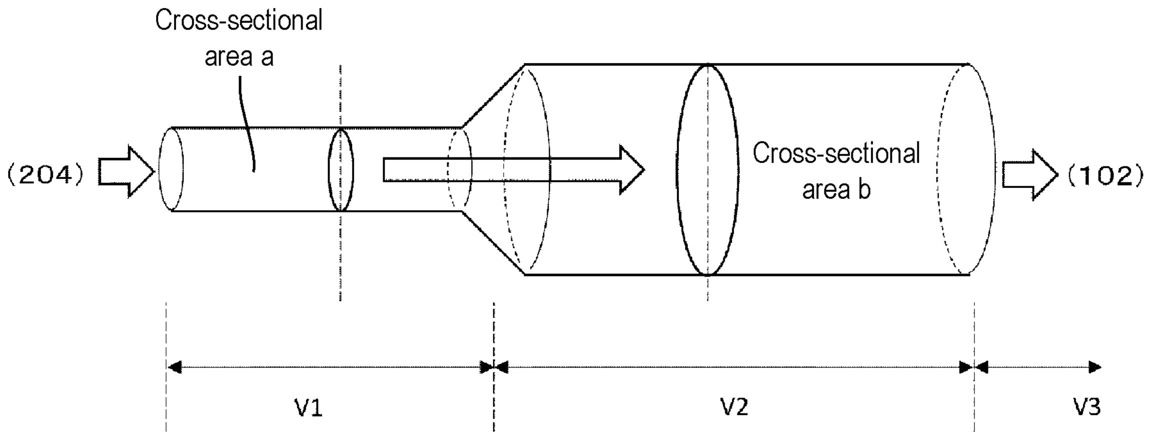

Furthermore, as described above, the flow path 302 of the connecting member 206 in the present example can be considered to function as, for example, a buffer that adjusts the flow rate of ink. The function of the flow path 302 as a buffer can also be considered by focusing on the flow velocity of the ink flowing through the flow path, for example, as shown in FIGS. 6A and 6B. FIGS. 6A and 6B are views describing a flow velocity of an ink flowing through the flow path 302 (see FIG. 2C) in a simplified manner. FIG. 6A is a view describing the flow velocity of the ink flowing through a flow path different from the flow path 302 of the present example, and shows an example of the flow velocity of the ink flowing through a flow path in which the flow path cross-sectional area is a constant cross-sectional area a as a whole. FIG. 6B is a view showing an example of a flow velocity of the ink flowing through the flow path 302 of the present example in a simplified manner, and shows a configuration corresponding to the flow path 302 in a simplified manner focusing on a flow path cross-sectional area at each position of the flow path 302. In addition, in FIG. 6B, a flow path cross-sectional area of a portion corresponding to the first flow path portion 312 (see FIG. 2C) on the upstream side of the second flow path portion 314 (see FIG. 2C), which is a thick portion in the flow path 302, is defined as a cross-sectional area a, and a flow path cross-sectional area of a portion corresponding to the second flow path portion 314 is defined as a cross-sectional area b larger than the cross-sectional area a.

When liquid such as ink flows through a flow path having a predetermined flow path cross-sectional area, the average flow velocity thereof can be usually considered to be a speed obtained by dividing the volume flow rate by the flow path cross-sectional area. The volume flow rate can also be considered to be the product of the flow velocity and the flow path cross-sectional area. In this case, when liquids having the same volume flow rate are flowed at different flow path cross-sectional areas, the average flow velocity can be considered to be inversely proportional to the flow path cross-sectional area. More specifically, for example, when the flow path cross-sectional area through which the liquid is flowed is doubled for the same volume flow rate, the average flow velocity becomes ½.

Furthermore, for example, as in the configuration shown in FIG. 6A, when the flow path cross-sectional area is constant, the flow velocity of the ink at each position of the flow path can be considered to be the same. FIG. 6A illustrates a case where the flow velocity of the ink at each position of the flow path becomes a predetermined flow velocity V1. Furthermore, the flow velocity V3 shown in the figure is the flow velocity of the ink flowing toward the nozzle of the inkjet head 102 after coming out from the outlet of the flow path on the inkjet head 102 side. The flow velocity V3 can be considered as, for example, an ink supply speed corresponding to the required amount of ink determined according to the amount of ink consumed in the inkjet head 102. In this case, it can be considered that the flow velocity V1 is determined according to the flow velocity V3.

On the other hand, for example, as in the configuration shown in FIG. 6B, when the flow path cross-sectional area differs depending on the position of the flow path, the flow velocity of the ink at each position of the flow path changes according to the flow path cross-sectional area. More specifically, as in the flow path 302 of the present example, in the case of the flow path in which the ink flows from the inlet to the outlet without branching or merging on the way, the volume flow rate at each position of the flow path is the same. As a result, the flow velocity of the ink at each position is inversely proportional to the flow path cross-sectional area. In this case, the flow velocity V2 of the ink at where the flow path cross-sectional area is the larger cross-sectional area b is slower than the flow velocity V1 of the ink at the portion where the flow path cross-sectional area is the cross-sectional area a.

With respect to these configurations, as in the configuration shown in FIG. 6A, when a flow path having a constant flow path cross-sectional area is used, for example, the flow velocity V1 of the ink in the flow path usually changes in proportion to the change in the flow velocity V3 when the flow velocity V3 corresponding to the ink supply speed changes. However, for example, when the flow velocity V3 temporarily becomes particularly large, the flow velocity V1 is likely to temporarily exceed the changeable range. On the other hand, for example, in the case of the configuration shown in FIG. 6B, the flow velocity V2 of the ink at the portion where the flow path cross-sectional area is the large cross-sectional area b is slower than the flow velocity V1, so that even when the flow velocity V3 temporarily becomes particularly large, for example, the flow velocity V2 can be appropriately changed with a margin. As a result, the portion where the flow path cross-sectional area is the large cross-sectional area b can appropriately function as, for example, a buffer. Furthermore, in this case, the portion where the flow path cross-sectional area is the large cross-sectional area b can be considered as, for example, storing the ink so that the ink can be supplied to the inkjet head 102 in time.

Figure 7A:
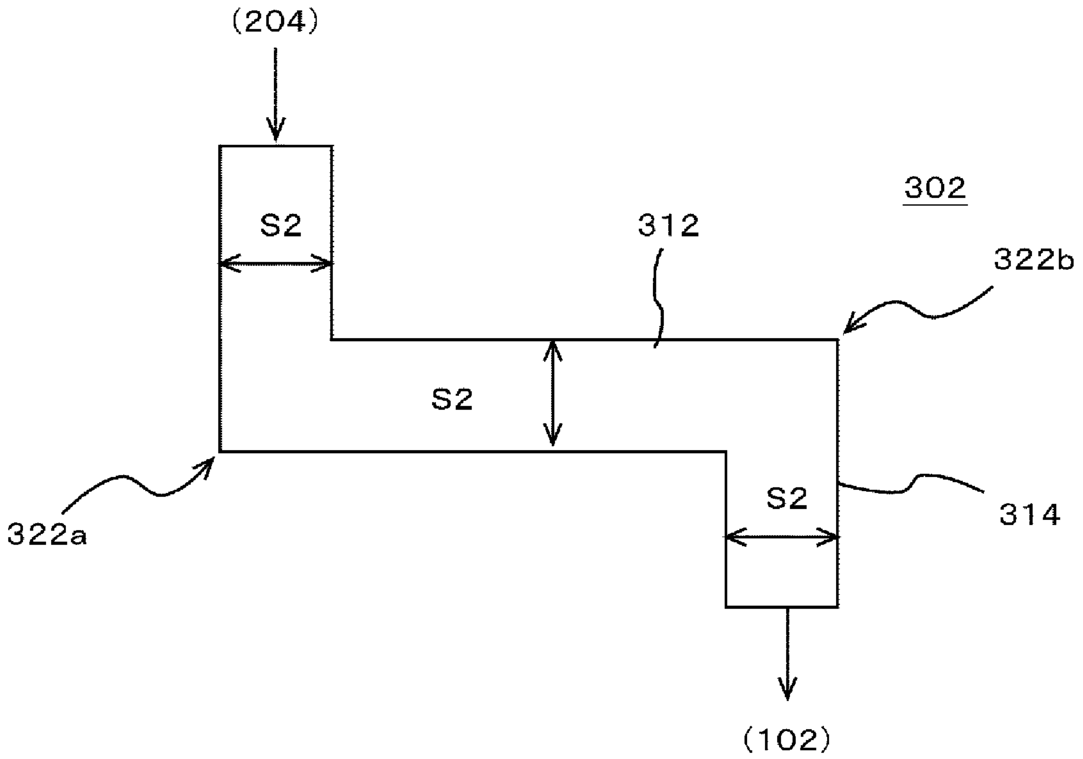
FIGS. 7A and 7B are views describing a modified example of the flow path 302 in the connecting member 206.
Figure 7B:
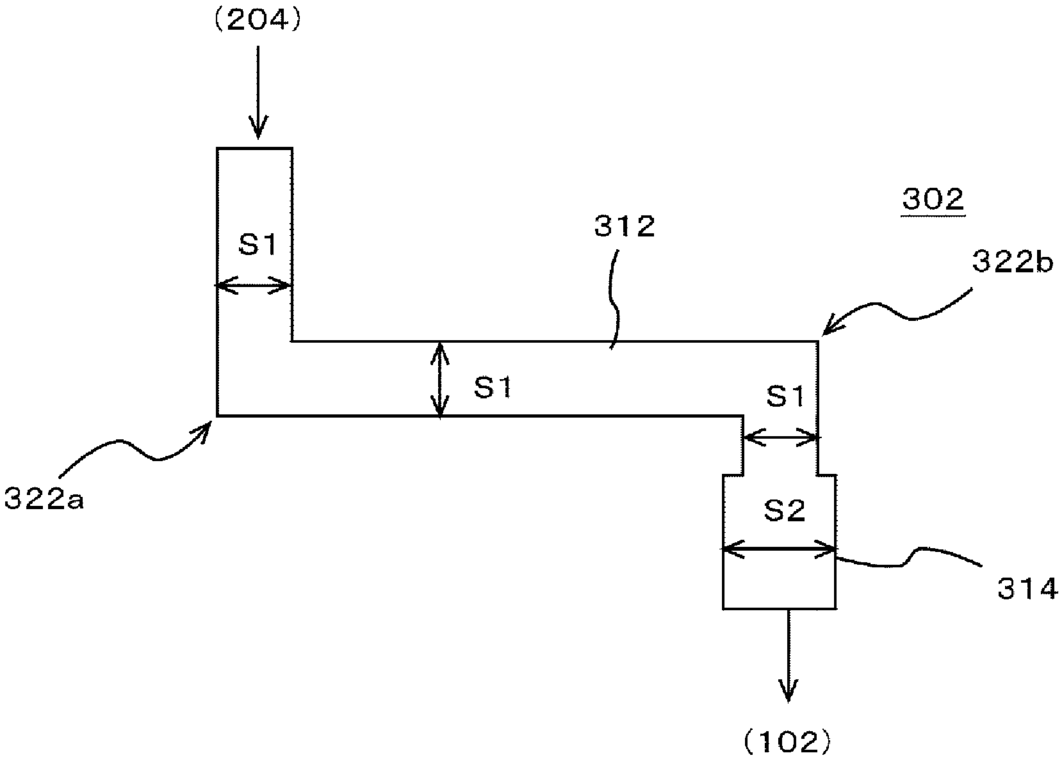

With respect to the specific configuration for obtaining the effects described above, the flow path 302 of the connecting member 206 is not limited to the configuration described above, and various modifications can be made. FIG. 7 is a view describing a modified example of the flow path 302 in the connecting member 206. FIGS. 7A and 7B show modified examples of the flow path 302. Other than the points described below, in FIG. 7, the configurations denoted with the same reference numbers as FIGS. 1 to 5 may have features same as or similar to the configurations in FIGS. 1 to 5. Furthermore, a modified example of the flow path 302 can be considered as, for example, a modified example of the flow path 302 used in the connecting member 206 of the present example illustrated in FIG. 2B, and the like.

As described above, in the flow path 302 in the connecting member 206, it can be considered that at least a part of the flow path 302 functions as an ink reservoir, for example, by thickening at least a part of the flow path 302. In this regard, the configuration of thickening the second flow path portion 314 in the flow path 302 has been mainly described above. However, when considering to function at least a part of the flow path 302 as an ink reservoir, for example, as shown in FIG. 7A, it is also conceivable to thicken the entire flow path 302. More specifically, in this case, with respect to the entire flow path 302, the flow path cross-sectional area at each position is larger than the flow path cross-sectional area of the output port 418 (see FIG. 4) of the pressure damper 204. Even when configured in such a manner, for example, the ink can be stored at a position closer to the inkjet head 102 than the pressure damper 204 with a margin with respect to the flow rate of the ink coming out from the output port 418 of the pressure damper 204. Thus, for example, when the amount of ink required in the inkjet head 102 (see FIG. 1A) is changed, a required amount of ink can be quickly and appropriately supplied to the inkjet head 102.

Here, even when using the connecting member 206 having such a flow path 302, it is conceivable to use the configuration same as or similar to the pressure damper 204 and the inkjet head 102 described above as the pressure damper 204 and the inkjet head 102. Thus, the thickness of the end portion of the flow path 302 may be considered to be, for example, a thickness corresponding to the output port 418 of the pressure damper 204 and the inlet 152 (see FIG. 2B) of the inkjet head 102.

Furthermore, when thickening the entire flow path 302 in the connecting member 206 as in the present modified example, for example, it is conceivable that the size of the connecting member 206 increases significantly. In this case, for example, the area required for installing the connecting member 206 becomes large, and it may become difficult to install the connecting member 206 near the inkjet head 102.

On the other hand, as described above, even when only a part of the flow path 302 is thickened, the flow path 302 can be caused to appropriately function as an ink reservoir. Therefore, in view of suppressing an increase in the size of the connecting member 206, it can be considered preferable to thicken only a part of the flow path 302 in the connecting member 206.

Furthermore, in a case where the configuration in which only a part of the flow path 302 in the connecting member 206 is thickened is employed, for example, if there is a thin portion at a position closer to the inkjet head 102 than the thickened portion, the flow path resistance of the thin portion on the downstream side becomes larger compared to the thick portion on the upstream side, so the ink is less likely to flow toward the inkjet head 102, and the effect of providing the thick portion in the flow path 302 may be deteriorated. Therefore, when using the configuration of thickening only a part of the flow path 302 in the connecting member 206, it is preferable to thicken the portion connected to the inkjet head 102. In this case, for example, as shown in FIG. 7B, it is conceivable to thicken a part of the most downstream portion of the second flow path portion 314, which is a straight line portion connected to the inkjet head 102. More specifically, in the modified example illustrated in FIG. 7B, the flow path cross-sectional area of the first flow path portion 312 in the flow path 302 of the connecting member 206 and the flow path cross-sectional area of a part of the second flow path portion 314 on the upstream side have a value S1 corresponding to the flow path cross-sectional area of the output port 418 of the pressure damper 204. A flow path cross-sectional area of a part of the second flow path portion 314 on the downstream side is a value S2 larger than S1. According to such configuration, the function of the ink reservoir can be appropriately imparted to the flow path 302 of the connecting member 206 while more appropriately suppressing the increase in the size of the connecting member 206. Such a configuration can also be considered as, for example, an example of a configuration in which an ink reservoir is provided in a portion immediately before the inkjet head 102 in the flow path 302.

Next, supplementary description and the like regarding each configuration described above will be made. In the following description, for the sake of convenience of explanation, configuration of the modified example shown in FIG. 7 or the like is referred to as the present example. As described above, in the present example, at least a part of the flow path 302 is caused to function as an ink reservoir by thickening at least a part of the flow path 302 in the connecting member 206. In this regard, if considering to store the ink with a margin between the pressure damper 204 and the inkjet head 102, it seems that an ink storage unit such as a sub tank may be used separately from the connecting member 206. However, in this case, a sub tank and the like need to be further added in the vicinity of the inkjet head 102 on the carriage 110 (see FIG. 1A). As a result, it becomes difficult to secure an installation space of each member in the carriage 110, and problems such as an increase in cost occur. On the other hand, in the present example, the ink can be stored with a margin between the pressure damper 204 and the inkjet head 102 without adding a new member.

Furthermore, regarding the storage of ink with a margin between the pressure damper 204 and the inkjet head 102, at first glance, for example, it seems sufficient to enhance the ink supply capacity of the pressure damper 204. However, as can be understood from the above description and the like, problems such as the spray generated when printing the barcode-like image and the stripe generated in the end region at the time of executing the solid printing are not merely the supply capacity of the pressure damper 204, but are matters related to the speed of change in the amount of ink coming out from the output port 418 of the pressure damper 204. In this regard, as described above, the pressure damper 204 is a mechanical damper using the valve 410 (see FIG. 4) or the like. In this case, a certain amount of time is usually required to change the amount of ink coming out from the output port 418 of the pressure damper 204 in accordance with the change in the amount of ink required in the inkjet head 102. Therefore, even if the ink supply capacity of the pressure damper 204 is simply increased, it is difficult to appropriately prevent the problems of spray and stripes.

On the other hand, in the present example, as described above, problems of spray and stripe can be appropriately prevented by thickening at least a part of the flow path 302 in the connecting member 206. Furthermore, in this case, at the thick portion functioning as the ink reservoir in the flow path 302, it is conceivable to store a sufficient amount to compensate for the delay in the change in the amount of ink coming out from the output port 418 of the pressure damper 204. According to such configuration, for example, the occurrence of unintended spray and stripes can be appropriately prevented even when the moving speed of the inkjet head 102 at the time of the main scan is increased. More specifically, it is conceivable to set the amount of ink stored in the flow path 302 in the connecting member 206 of the present example to, for example, two times or more of the case where the flow path 302 is not thickened. In this case, the amount of ink stored in the flow path 302 can be considered as, for example, the volume of the flow path 302. Furthermore, thickening at least a part of the flow path 302 can be considered as, for example, increasing the volume of at least a part of the flow path 302. Furthermore, the amount of ink stored when the flow path 302 is not thickened can be considered as, for example, the amount of ink stored in the flow path 302 when the flow path 302 in which the flow path cross-sectional area at each position is equal to the flow path cross-sectional area of the output port 418 of the pressure damper 204 is used. Furthermore, the amount of ink stored in the flow path 302 in the connecting member 206 of the present example is more preferably, for example, three times or more of the case where the flow path 302 is not thickened. Furthermore, when considering to increase the amount of ink stored in the flow path 302 in the connecting member 206, it seems to be sufficient to use the flow path 302 having a long path instead of thickening at least a part of the flow path 302. However, in this case, for example, it is conceivable that the connecting member 206 is enlarged by forming the long flow path 302. Furthermore, if an attempt is made to form the long flow path 302 without increasing the size of the connecting member 206, the number of bent portions of the flow path 302 may increase, and the ink may become difficult to flow. Thus, it is preferable to use a configuration in which at least one part is thickened as described above, as the flow path 302.

Furthermore, in the flow path 302 of the connecting member 206 of the present example, the flow path cross-sectional area of at least one part is larger than the flow path cross-sectional area of the output port 418 of the pressure damper 204. However, for example, in a modified example of the pressure damper 204, for example, it is conceivable to make the flow path cross-sectional area of the output port 418 larger than the flow path cross-sectional area corresponding to the supply capacity of the pressure damper 204. In this case, the flow path cross-sectional area of the thick portion in the flow path 302 is considered to be less than or equal to the flow path cross-sectional area of the output port 418. Therefore, in such a case, it can be considered that the feature of the thick portion in the flow path 302 is not the flow path cross-sectional area of the output port 418 but the flow path cross-sectional area larger than the flow path cross-sectional area corresponding to the supply capability of the pressure damper 204. Moreover, in this case, the thick portion in the flow path 302 can be considered as, for example, having a thickness that becomes an ink reservoir having the function of the buffer described above.

As described above, in the present example, the inkjet head 102 includes six nozzle rows. In this regard, the problem of spray and stripes described above is considered to easily occur particularly when the number of nozzle rows included in one inkjet head 102 is large. More specifically, when the number of nozzle rows included in one inkjet head 102 is large, the moving speed of the inkjet head 102 at the time of the main scan can be usually made higher. In this case, the change in amount of ink required in the inkjet head 102 becomes faster, and the change in the amount of ink coming out from the output port 418 of the pressure damper 204 tends to be late. As a result, for example, when the connecting member 206 having the conventional configuration is used, the problem of spray and stripes is likely to occur. Furthermore, in a case where the number of nozzle rows included in one inkjet head 102 is large, the amount of ink required in the inkjet head 102 variously changes as the number of ejection nozzle rows variously changes. Furthermore, in this case, it is also conceivable that the amount of change in the required amount of ink caused by change of one row in the number of ejection nozzle rows becomes small, for example, as the number of nozzle rows increases. In this case, in the pressure damper 204, it is necessary to change the amount of ink coming out from the output port 418 every time the number of ejection nozzle rows changes so that the difference in the amount of ink for each stage is small and the amount of ink changes at a plurality of stages corresponding to the number of nozzle rows. In such a case, for example, it is conceivable that the movement of the valve 410 in the pressure damper 204 becomes difficult to follow with respect to the change in the required amount of ink. Therefore, in a case where the number of nozzle rows included in one inkjet head 102 is large, if the moving speed of the inkjet head 102 at the time of the main scan becomes high, for example, the change in the amount of ink coming out from the output port 418 of the pressure damper 204 may not be in time with respect to the change in the number of ejection nozzle rows. Furthermore, as a result, it is conceivable that a problem arises in the quality of printing.

Furthermore, in this regard, as described above, for example, the main scan can be performed so that the change in the amount of ink coming out from the output port 418 of the pressure damper 204 can be made in time by slowing the moving speed of the inkjet head 102 at the time of the main scan or increasing the pass number of printing. However, in this case, the printing speed is greatly reduced.

On the other hand, in the present example, in a case where the number of nozzle rows included in one inkjet head 102 is large and the like, the ink can be appropriately supplied to each nozzle row of the inkjet head 102 even when the change in the amount of ink coming out from the output port 418 of the pressure damper 204 is not in time with respect to the change in the number of ejection nozzle rows. This allows, for example, high quality printing to be carried out at higher speed. Furthermore, when the number of nozzle rows included in one inkjet head 102 increases, for example, when a specific condition occurs at the time of the main scan, and the like due to an increase in the maximum amount of ink consumed in the inkjet head 102, the amount of ink required in the inkjet head 102 may change rapidly in stages. In this case, for example, it is conceivable that the supply of ink from the pressure damper 204 may not be in time for a significant increase in the amount of ink required in the inkjet head 102. Furthermore, in this case, it is conceivable that if the connecting member 206 having the conventional configuration is used, for example, the supply speed of the ink from the ink supply system 108 (see FIG. 2A) to the inkjet head 102 may not catch up with the consuming speed of the ink, and hence the ink stored in the ink chamber or the like in the inkjet head 102 may become empty thus affecting the quality of printing. On the other hand, in the present example, high quality printing can be more appropriately performed even in such a case by using the connecting member 206 having the configuration described above. Furthermore, the problem caused by the increase in the number of nozzle rows is considered to be significant, for example, when the number of nozzle rows to which ink is supplied from the common pressure damper 204 in one inkjet head 102 is four rows or more. Therefore, the connecting member 206 of the present example can be considered to be particularly preferable to use, for example, when the number of nozzle rows included in the inkjet head 102 is four rows or more.

In addition, regarding the ink path for supplying ink from the ink container 106 (see FIG. 1A) to the inkjet head 102 in the printing apparatus 100 (see FIG. 1A), the configuration and the like have been described mainly focusing on the path for supplying ink for one color. In this regard, as described above, in the present example, the ink supply system 108 includes the flow path 202, the pressure damper 204, and the connecting member 206 as a configuration for supplying from the ink container 106 to one inkjet head 102. In this case, the ink supply system 108 includes, for example, the flow path 202, the pressure damper 204, and the connecting member 206 so as to supply ink from different ink containers 106 to the respective inkjet heads 102. Furthermore, in this case, the ink supply system 108 includes, for example, a plurality of flow paths 202 corresponding to each of the plurality of inkjet heads 102 as the flow path 202. Each of the inkjet heads 102 may have a pressure damper 204 and a connecting member 206.

As the pressure damper 204 and the connecting member 206, for example, a member in which the configurations for the plurality of inkjet heads 102 are collected may be used. In this case, one pressure damper 204 has, for example, a plurality of sets of the configuration illustrated in FIG. 4. Furthermore, in this case, the pressure damper 204 can be considered to have, for example, an in-adjustment mechanism flow path independent from each other for the plurality of inkjet heads 102. In this case, the pressure damper 204 receives the supply of ink from the plurality of ink containers 106 through the plurality of flow paths 202 independent from each other at the plurality of input ports 416. Furthermore, the ink is supplied from the plurality of output ports 418 corresponding to any one of the inkjet heads 102 to the plurality of inkjet heads 102 through the connecting member 206. More specifically, as the pressure damper 204, for example, consideration is made to adjust the pressure of the ink with two systems of in-adjustment mechanism flow path corresponding to the two inkjet heads 102.

As the connecting member 206, for example, a member that holds the plurality of pressure dampers 204 may be used. In this case, the connecting member 206 supplies the ink supplied from the plurality of pressure dampers 204 to the plurality of inkjet heads 102. Furthermore, in this case, the connecting member 206 includes a plurality of flow paths 302 independent from each other, and supplies the ink from the respective flow path 302 to the respective inkjet head 102. In this case as well, for example, high-speed and high-quality printing can be appropriately carried out by using the flow path 302 having the configuration described above.

More specifically, for example, it is conceivable to use a member that holds two pressure dampers 204 as the connecting member 206. In this case, the connecting member 206 may hold, for example, two pressure dampers 204 each having two systems of in-adjustment mechanism flow paths. According to such configuration, for example, the ink can be supplied from one connecting member 206 to the four inkjet heads 102. Thus, for example, the number of members to be installed at the periphery of the inkjet head 102 in the carriage 110 (see FIG. 1A) can be appropriately reduced.

In the description made above, the configuration in a case where ink is ejected onto the medium has been mainly described for the printing apparatus 100. In this case, the printing apparatus 100 can be considered as, for example, an inkjet printer that draws a two-dimensional image on a medium. However, in the modified example of the printing apparatus 100, it is also conceivable to use, as the printing apparatus 100, a 3D printer (3D printing apparatus) or the like that shapes a stereoscopic shaped object. Furthermore, in this case, a shaping table that supports a shaped object being shaped and a shaped object being shaped can be considered as targets to which the ink is to be ejected. In this case as well, for example, the shaped object can be appropriately shaped at high quality by supplying the ink to the inkjet head 102 with the configuration similar to the above. The printing apparatus 100 can also be considered as, for example, an example of a liquid ejection apparatus. In this case, the ink can be considered as, for example, an example of liquid ejected by the liquid ejection apparatus.

The present disclosure can be suitably used in, for example, a printing apparatus.

What is claimed is:

1. A printing apparatus that performs printing through an inkjet method, the printing apparatus comprising:

an inkjet head that ejects ink through the inkjet method; and an ink supply system that supplies ink to the inkjet head from an ink container that stores ink outside the inkjet head, wherein the ink supply system includes:

a pressure adjustment mechanism that adjusts a pressure of ink supplied to the inkjet head;

a container-side flow path that is an ink flow path for flowing ink from the ink container to the pressure adjustment mechanism; and a connecting member that is a member connecting the pressure adjustment mechanism and the inkjet head, and is formed with a head-side flow path that is an ink flow path for flowing ink from the pressure adjustment mechanism to the inkjet head, the inkjet head is provided with an ink inlet for introducing ink into the inkjet head, and the connecting member is attached to the ink inlet, the pressure adjustment mechanism supplies ink adjusted to a pressure in a predetermined range lower than an atmospheric pressure from a pressure adjustment mechanism outlet that is an outlet connected to the head-side flow path to the head-side flow path, and a flow path cross-sectional area of at least a part of the head-side flow path in the connecting member is larger than a flow path cross-sectional area of the pressure adjustment mechanism outlet.

2. The printing apparatus according to claim 1, wherein the head-side flow path is a flow path including at least one bent portion where a direction in which ink flows changes, and includes:

a first flow path portion that is a flow path through which ink flows on an upstream side of the bent portion at a position closest to an outlet on a side of the inkjet head in the head-side flow path, and a second flow path portion that is a flow path through which ink flows at a position closer to the inkjet head than the first flow path portion, and that flows ink linearly in a certain direction to the outlet on the side of the inkjet head in the head-side flow path, and a flow path cross-sectional area of at least a part of the second flow path portion is larger than the flow path cross-sectional area of the pressure adjustment mechanism outlet and larger than a flow path cross-sectional area of the first flow path portion.

3. The printing apparatus according to claim 2, further comprising a main scan driving unit that causes the inkjet head to perform a main scan of ejecting ink while relatively moving with respect to an ink ejecting target in a main scanning direction set in advance, wherein the inkjet head includes four or more nozzle rows in which a plurality of nozzles are arranged with positions in a nozzle row direction orthogonal to the main scanning direction being different from each other, and each of the nozzle rows in the inkjet head is a nozzle row that ejects ink of the same color supplied from the pressure adjustment mechanism through the head-side flow path, and is arranged in the main scanning direction with positions in the main scanning direction being different from each other.

4. The printing apparatus according to claim 1, further comprising a main scan driving unit that causes the inkjet head to perform a main scan of ejecting ink while relatively moving with respect to an ink ejecting target in a main scanning direction set in advance, wherein the inkjet head includes four or more nozzle rows in which a plurality of nozzles are arranged with positions in a nozzle row direction orthogonal to the main scanning direction being different from each other, and each of the nozzle rows in the inkjet head is a nozzle row that ejects ink of the same color supplied from the pressure adjustment mechanism through the head-side flow path, and is arranged in the main scanning direction with positions in the main scanning direction being different from each other.

5. The printing apparatus according to claim 4, wherein when an operation of ejecting ink from any one of the nozzles in the inkjet head with respect to all ejection positions set according to a resolution of printing is defined as solid printing, a region where the number of the nozzle rows that simultaneously eject ink changes accompanying a relative movement of the inkjet head in the main scanning direction in the main scan in a vicinity of an end in the main scanning direction of a region where the solid printing is performed is defined as a nozzle row number changing region, and a portion other than the nozzle row number changing region in the region where the solid printing is performed is defined as a nozzle row number constant region, in the main scan, the main scan driving unit relatively moves the inkjet head in the main scanning direction at a speed the ink is supplied from the pressure adjustment mechanism to all the nozzle rows in the inkjet head in the nozzle row number constant region and a change in an amount of ink coming out from the pressure adjustment mechanism outlet is not in time with respect to a change in the number of nozzle rows for ejecting ink in the nozzle row number changing region on at least one side in the main scanning direction.

6. The printing apparatus according to claim 5, wherein if the flow path cross-sectional area of at least a part of the head-side flow path in the connecting member is larger than the flow path cross-sectional area of the pressure adjustment mechanism outlet, the head-side flow path of the connecting member functions as a buffer that adjusts a flow rate of ink between the pressure adjustment mechanism outlet and the inkjet head, and supplies ink of an amount required by the nozzle row that ejects ink to the nozzle row when the change in the amount of ink coming out from the pressure adjustment mechanism outlet is not in time with respect to the change in the number of the nozzle rows that eject ink.

7. The printing apparatus according to claim 6, wherein the pressure adjustment mechanism includes:

an ink storage unit that stores ink in the middle of an in-adjustment mechanism flow path that is an ink flow path that flows ink supplied from the ink container toward the inkjet head in the pressure adjustment mechanism;

a pressure adjusting unit that adjusts a pressure of the ink stored in the ink storage unit to a pressure lower than the atmospheric pressure; and a valve disposed between the ink storage unit and the inkjet head in the in-adjustment mechanism flow path, the ink storage unit is a storage unit having an opening, the pressure adjusting unit includes:

a flexible film that covers the opening of the ink storage unit in a state where a side opposite to the ink storage unit is exposed to the atmosphere; and a biasing unit configured to bias the flexible film in a direction away from the ink storage unit, the pressure of the ink stored in the ink storage unit is adjusted to a pressure lower than the atmospheric pressure by biasing the flexible film by the biasing unit, and the valve opens and closes according to a difference between a pressure of the ink on a side of the inkjet head in the in-adjustment mechanism flow path and a pressure of the ink in the ink storage unit, so that the ink adjusted to the pressure in the predetermined range flows toward the inkjet head.

8. The printing apparatus according to claim 6, wherein when a configuration of supplying ink from the pressure adjustment mechanism to the inkjet head using the connecting member having the head-side flow path in which the flow path cross-sectional area of at least one part is larger than the flow path cross-sectional area of the pressure adjustment mechanism outlet is defined as a first ink supply configuration, and a configuration of using a flow path in which a flow path cross-sectional area is smaller than or equal to the flow path cross-sectional area of the pressure adjustment mechanism outlet at all positions as a flow path for supplying ink from the pressure adjustment mechanism to the inkjet head is defined as a second ink supply configuration, in the nozzle row number changing region on a side where the number of the nozzle rows that simultaneously eject ink gradually increases, the main scan driving unit relatively moves the inkjet head in the main scanning direction at a speed at which the ink supplied to the nozzle row that is to eject ink is insufficient at least at some timings when the ink is supplied to the inkjet head in the second ink supply configuration, and the connecting member supplies the ink to the inkjet head so as not to cause shortage of the ink supplied to the nozzle row that is to eject ink in the nozzle row number changing region on a side where the number of the nozzle rows that simultaneously eject the ink gradually increases by supplying the ink to the inkjet head in the first ink supply configuration.

9. The printing apparatus according to claim 5, wherein the pressure adjustment mechanism includes:

an ink storage unit that stores ink in the middle of an in-adjustment mechanism flow path that is an ink flow path that flows ink supplied from the ink container toward the inkjet head in the pressure adjustment mechanism;

a pressure adjusting unit that adjusts a pressure of the ink stored in the ink storage unit to a pressure lower than the atmospheric pressure; and a valve disposed between the ink storage unit and the inkjet head in the in-adjustment mechanism flow path, the ink storage unit is a storage unit having an opening, the pressure adjusting unit includes:

a flexible film that covers the opening of the ink storage unit in a state where a side opposite to the ink storage unit is exposed to the atmosphere; and a biasing unit configured to bias the flexible film in a direction away from the ink storage unit, the pressure of the ink stored in the ink storage unit is adjusted to a pressure lower than the atmospheric pressure by biasing the flexible film by the biasing unit, and the valve opens and closes according to a difference between a pressure of the ink on a side of the inkjet head in the in-adjustment mechanism flow path and a pressure of the ink in the ink storage unit, so that the ink adjusted to the pressure in the predetermined range flows toward the inkjet head.

10. The printing apparatus according to claim 9, wherein when a configuration of supplying ink from the pressure adjustment mechanism to the inkjet head using the connecting member having the head-side flow path in which the flow path cross-sectional area of at least one part is larger than the flow path cross-sectional area of the pressure adjustment mechanism outlet is defined as a first ink supply configuration, and a configuration of using a flow path in which a flow path cross-sectional area is smaller than or equal to the flow path cross-sectional area of the pressure adjustment mechanism outlet at all positions as a flow path for supplying ink from the pressure adjustment mechanism to the inkjet head is defined as a second ink supply configuration, in the nozzle row number changing region on a side where the number of the nozzle rows that simultaneously eject ink gradually increases, the main scan driving unit relatively moves the inkjet head in the main scanning direction at a speed at which the ink supplied to the nozzle row that is to eject ink is insufficient at least at some timings when the ink is supplied to the inkjet head in the second ink supply configuration, and the connecting member supplies the ink to the inkjet head so as not to cause shortage of the ink supplied to the nozzle row that is to eject ink in the nozzle row number changing region on a side where the number of the nozzle rows that simultaneously eject the ink gradually increases by supplying the ink to the inkjet head in the first ink supply configuration.

11. The printing apparatus according to claim 5, wherein when a configuration of supplying ink from the pressure adjustment mechanism to the inkjet head using the connecting member having the head-side flow path in which the flow path cross-sectional area of at least one part is larger than the flow path cross-sectional area of the pressure adjustment mechanism outlet is defined as a first ink supply configuration, and a configuration of using a flow path in which a flow path cross-sectional area is smaller than or equal to the flow path cross-sectional area of the pressure adjustment mechanism outlet at all positions as a flow path for supplying ink from the pressure adjustment mechanism to the inkjet head is defined as a second ink supply configuration, in the nozzle row number changing region on a side where the number of the nozzle rows that simultaneously eject ink gradually increases, the main scan driving unit relatively moves the inkjet head in the main scanning direction at a speed at which the ink supplied to the nozzle row that is to eject ink is insufficient at least at some timings when the ink is supplied to the inkjet head in the second ink supply configuration, and the connecting member supplies the ink to the inkjet head so as not to cause shortage of the ink supplied to the nozzle row that is to eject ink in the nozzle row number changing region on a side where the number of the nozzle rows that simultaneously eject the ink gradually increases by supplying the ink to the inkjet head in the first ink supply configuration.

12. A printing method that performs printing through an inkjet method, the printing method comprising steps of:

with respect to an inkjet head that ejects ink through the inkjet method;

supplying ink to the inkjet head from an ink container that stores ink outside the inkjet head by an ink supply system, wherein the ink supply system includes:

a pressure adjustment mechanism that adjusts a pressure of ink supplied to the inkjet head;

a container-side flow path that is an ink flow path for flowing ink from the ink container to the pressure adjustment mechanism; and a connecting member that is a member connecting the pressure adjustment mechanism and the inkjet head, and is formed with a head-side flow path that is an ink flow path for flowing ink from the pressure adjustment mechanism to the inkjet head, the inkjet head is provided with an ink inlet for introducing ink into the inkjet head, and the connecting member is attached to the ink inlet, the pressure adjustment mechanism supplies ink adjusted to a pressure in a predetermined range lower than an atmospheric pressure from a pressure adjustment mechanism outlet that is an outlet connected to the head-side flow path to the head-side flow path, and a flow path cross-sectional area of at least a part of the head-side flow path in the connecting member is larger than a flow path cross-sectional area of the pressure adjustment mechanism outlet.

13. A printing apparatus that performs printing through an inkjet method, the printing apparatus comprising:

an inkjet head that ejects ink through the inkjet method; and an ink supply system that supplies ink to the inkjet head from an ink container that stores ink outside the inkjet head, wherein the ink supply system includes:

a pressure adjustment mechanism that adjusts a pressure of ink supplied to the inkjet head;

a container-side flow path that is an ink flow path for flowing ink from the ink container to the pressure adjustment mechanism; and a connecting member that is a member connecting the pressure adjustment mechanism and the inkjet head, and is formed with a head-side flow path that is an ink flow path for flowing ink from the pressure adjustment mechanism to the inkjet head, the inkjet head is provided with an ink inlet for introducing ink into the inkjet head, and the connecting member is attached to the ink inlet, the pressure adjustment mechanism supplies ink adjusted to a pressure in a predetermined range lower than an atmospheric pressure from a pressure adjustment mechanism outlet that is an outlet connected to the head-side flow path to the head-side flow path, and the head-side flow path functions as a buffer that adjusts a flow rate of ink between the pressure adjustment mechanism outlet and the inkjet head by storing ink in a previous stage of the inkjet head, and supplies ink of an amount required by the inkjet head to the inkjet head when a change in an amount of ink coming out from the pressure adjustment mechanism outlet is not in time with respect to a change in an amount of ink required by the inkjet head.

* * * * *